United States Patent
Shima et al.

(10) Patent No.: US 11,924,937 B2
(45) Date of Patent: Mar. 5, 2024

(54) LIGHT-EMITTING DEVICE, LIGHTING DEVICE, AND OPTICAL MEMBER

(71) Applicant: NICHIA CORPORATION, Anan (JP)

(72) Inventors: Kohei Shima, Tokushima (JP); Yohei Kawano, Tokushima (JP); Akira Asano, Tokushima (JP)

(73) Assignee: NICHIA CORPORATION, Anan (JP)

( * ) Notice: Subject to any disclaimer, the term of this patent is extended or adjusted under 35 U.S.C. 154(b) by 339 days.

(21) Appl. No.: 17/327,047

(22) Filed: May 21, 2021

(65) Prior Publication Data

US 2021/0278060 A1 Sep. 9, 2021

Related U.S. Application Data

(63) Continuation of application No. 16/668,984, filed on Oct. 30, 2019, now Pat. No. 11,047,549.

(30) Foreign Application Priority Data

Oct. 31, 2018 (JP) .................................. 2018-205312
Dec. 20, 2018 (JP) .................................. 2018-238170

(51) Int. Cl.
*H05B 45/20* (2020.01)
*F21K 9/237* (2016.01)
(Continued)

(52) U.S. Cl.
CPC ............ *H05B 45/20* (2020.01); *F21K 9/237* (2016.08); *F21K 9/278* (2016.08); *F21K 9/61* (2016.08);
(Continued)

(58) Field of Classification Search
CPC ................................ H05B 45/20; H05B 45/40
See application file for complete search history.

(56) References Cited

U.S. PATENT DOCUMENTS 9,890,926 B2 2/2018 Preston et al.
11,582,847 B2 * 2/2023 Medricky ............... F21K 9/232
(Continued)

FOREIGN PATENT DOCUMENTS

CN 205991444 U 3/2017
JP 2002-43629 A 2/2002
(Continued)

OTHER PUBLICATIONS

Final Rejection issued in U.S. Appl. No. 16/668,984, dated Nov. 9, 2020.
(Continued)

*Primary Examiner* — Keith G. Delahoussaye
(74) *Attorney, Agent, or Firm* — Birch, Stewart, Kolasch & Birch, LLP

(57) ABSTRACT

A light-emitting device includes an optical member including first and second light emitting elements, first and second light condenser portions, and a light guide portion. The first light condenser portion is disposed at a position corresponding to the first light-emitting element, and condenses a portion of light emitted from the first light-emitting element. The second light condenser portion surrounds the first light condenser portion, and condenses a portion of the light that is not incident to the first light condenser portion among the light emitted from the first light-emitting element. The light guide portion is disposed at a periphery of the second light condenser portion and at a position corresponding to the second light-emitting element, and guides light emitted from the second light-emitting element by causing total reflection in an interior of the light guide portion. A full width at half maximum of light exiting from the light guide portion is larger than a full width at half maximum of light exiting from the first light condenser portion.

13 Claims, 17 Drawing Sheets

(51) Int. Cl.
*F21K 9/278* (2016.01)
*F21K 9/61* (2016.01)
*F21V 5/04* (2006.01)
*F21V 7/04* (2006.01)
*H05B 45/40* (2020.01)

(52) U.S. Cl.
CPC ............... *F21V 5/045* (2013.01); *F21V 7/04* (2013.01); *H05B 45/40* (2020.01)

(56) References Cited

U.S. PATENT DOCUMENTS

| | | |
|---|---|---|
| 2011/0031890 A1 | 2/2011 | Stack |
| 2012/0104953 A1 | 5/2012 | Chobot |
| 2015/0252981 A1 | 9/2015 | Nakamura |
| 2016/0381749 A1 | 12/2016 | Catalano |
| 2017/0048941 A1* | 2/2017 | Kondo ................ H05B 45/40 |
| 2017/0198884 A1 | 7/2017 | Nakamura |
| 2017/0307174 A1 | 10/2017 | Sumitani |
| 2018/0213623 A1* | 7/2018 | Harada ................ H05B 45/24 |
| 2018/0220508 A1 | 8/2018 | Pilat et al. |
| 2018/0245771 A1 | 8/2018 | Liu et al. |

FOREIGN PATENT DOCUMENTS

| | | |
|---|---|---|
| JP | 2004-103503 A | 4/2004 |
| JP | 2007-335101 A | 12/2007 |
| JP | 3172217 U | 12/2011 |
| JP | 2013-8566 A | 1/2013 |
| JP | 2013-131442 A | 7/2013 |
| JP | 2013-134898 A | 7/2013 |
| JP | 2014-115506 A | 6/2014 |
| JP | 2014-146563 A | 8/2014 |
| JP | 2015-162407 A | 9/2015 |
| JP | 2016-170912 A | 9/2016 |
| JP | 2017-208261 A | 11/2017 |
| JP | 2016-21303 A | 2/2018 |
| WO | WO 2016/047242 A1 | 3/2016 |

OTHER PUBLICATIONS

Final Rejection issued in U. S. U.S. Appl. No. 16/668,984, dated Oct. 6, 2020.
Non-Final Rejection issued in U.S. Appl. No. 16/668,984, dated Jun. 18, 2020.
Notice of Allowance issued in U.S. Appl. No. 16/668,984, dated Mar. 1, 2021.

* cited by examiner

LIGHT-EMITTING DEVICE, LIGHTING DEVICE, AND OPTICAL MEMBER

CROSS-REFERENCE TO RELATED APPLICATIONS

This application is a Continuation of copending U.S. application Ser. No. 16/668,984, filed on Oct. 30, 2019, which claims the benefit of priority under 35 U.S.C. § 119(a) from the prior Japanese Patent Application No. 2018-205312, filed on Oct. 31, 2018, and the prior Japanese Patent Application No. 2018-238170, filed on Dec. 20, 2018, each of which is hereby expressly incorporated by reference into the present application in its entirety.

FIELD

Embodiments relate to a light-emitting device, a lighting device and an optical member.

BACKGROUND

In recent years, a lighting device that can switch the light distribution angle is desirable. For example, it is desirable for one lighting device to illuminate an entire room by increasing the light distribution angle for one condition, and to illuminate a narrow area by reducing the light distribution angle for another condition. To realize such a lighting device, it may be considered to use mechanical means to change the positional relationship of a light source and an optical system. However, a lighting device in which such mechanical means is provided is undesirably large and expensive, needs time to switch, and has poor interior-stylishness.

SUMMARY

A light-emitting device according to certain embodiment, includes one or more first light-emitting elements, one or more second light-emitting elements, and an optical member including a first light condenser portion, a second light condenser portion, and a first light guide portion. The first light condenser portion is disposed at a position corresponding to the first light-emitting element. The first light condenser portion condenses a portion of light emitted from the first light-emitting element. The second light condenser portion surrounds the first light condenser portion. The second light condenser portion condenses a portion of the light that is not incident to the first light condenser portion among the light emitted from the first light-emitting element. The first light guide portion surrounds the second light condenser portion and at a position corresponding to the second light-emitting element. The first light guide portion guides light emitted from the second light-emitting element by causing total reflection in an interior of the first light guide portion. A full width at half maximum of light exiting from the first light guide portion is larger than a full width at half maximum of light exiting from the first light condenser portion.

A light-emitting device according to certain embodiment, includes an optical member including a first light condenser portion, a second light condenser portion, a first light guide portion, one or more first light-emitting elements, and one or more second light-emitting elements. The first light condenser portion has a convex lens. The second light condenser portion surrounds the first light condenser portion. The second light condenser portion has an inner surface and an outer surface being curved outward as approaching a light exiting surface, while being disposed at a periphery of the first light condenser portion. The first light guide portion has a tubular configuration surrounding a periphery of the second light condenser portion in an annular configuration. The one or more first light-emitting elements are disposed at a position corresponding to the first light condenser portion. The one or more second light-emitting elements are disposed at a position corresponding to the first light guide portion.

An optical member according to certain embodiment, includes a first light condenser portion condensing light incident on a first light incident region, a second light condenser portion surrounding the first light condenser portion, and a first light guide portion surrounding the second light condenser portion. The second light condenser portion condenses a portion of the light that is not incident to the first light condenser portion and outputs from a position facing the first light incident region The first light guide portion guides light emitted from the second light-emitting element by causing total reflection in an interior of the first light guide portion. A full width at half maximum of light exiting from the first light guide portion is larger than a full width at half maximum of light exiting from the first light condenser portion.

An optical member according to certain embodiment, includes a first light condenser portion, a second light condenser portion having an inner surface and an outer surface being curved outward as approaching a light exiting surface, the second light condenser portion surrounding the first light condenser portion; and a first light guide portion having a tubular configuration surrounding a periphery of the second light condenser portion in an annular configuration.

A light-emitting circuit according to certain embodiment, includes one or more first light-emitting elements disposed in a first region, and one or more second light-emitting elements surrounding the first region. A color temperature of light emitted from the second light-emitting element is different from a color temperature of light emitted from the first light-emitting element. A first circuit and a second circuit are connected in parallel to each other. The first circuit includes the one or more first light-emitting elements. The second circuit includes the one or more second light-emitting elements. A number of stages of the first light-emitting elements connected in series in the first circuit is less than a number of stages of the second light-emitting elements connected in series in the second circuit.

DETAILED DESCRIPTION

First Embodiment

First, a first embodiment will be described.

Figure 1:
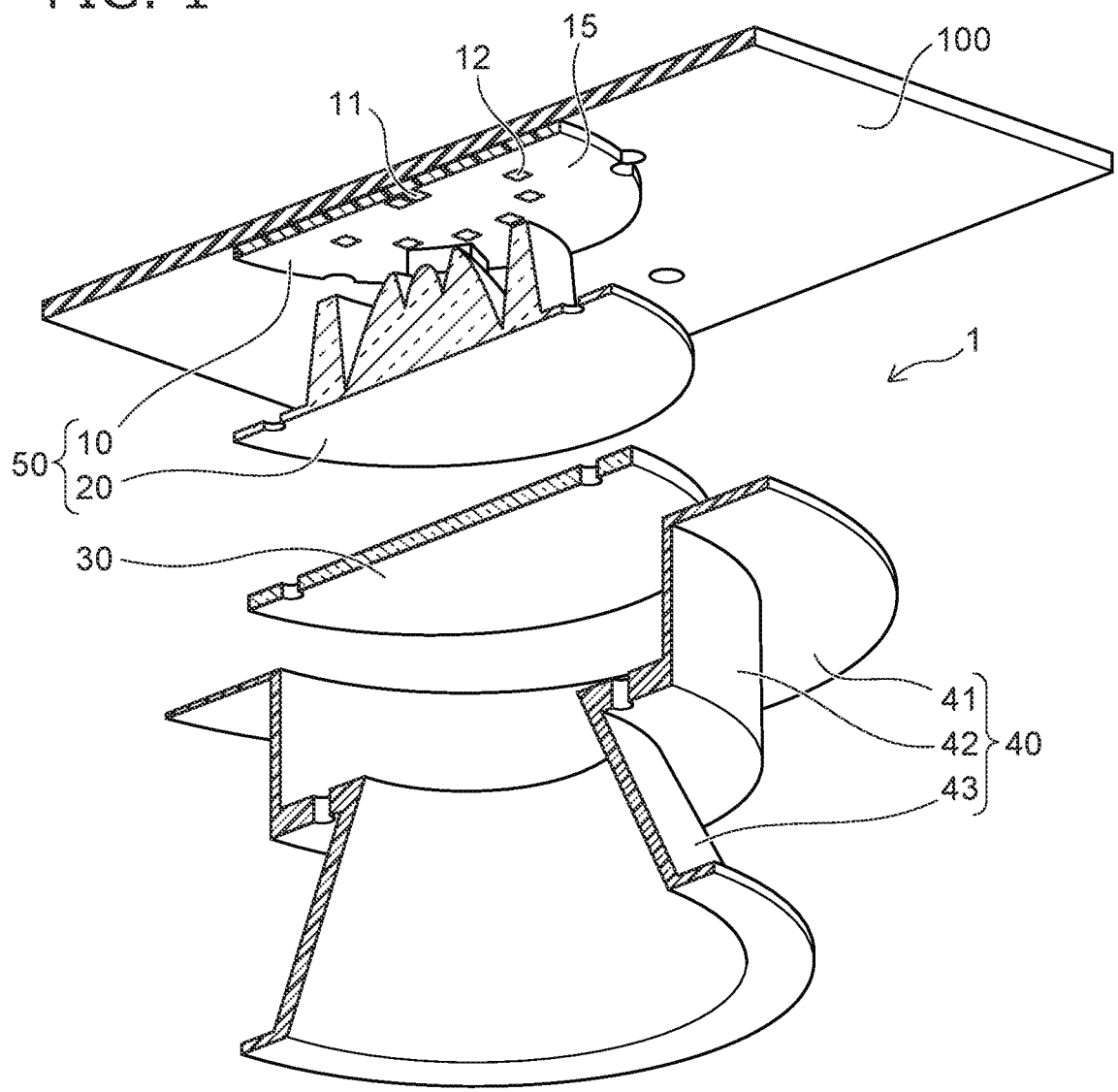
FIG. 1 is an exploded perspective end view showing a lighting device according to a first embodiment.

FIG. 1 is an exploded perspective end view showing a lighting device according to an embodiment.

Figure 2A:
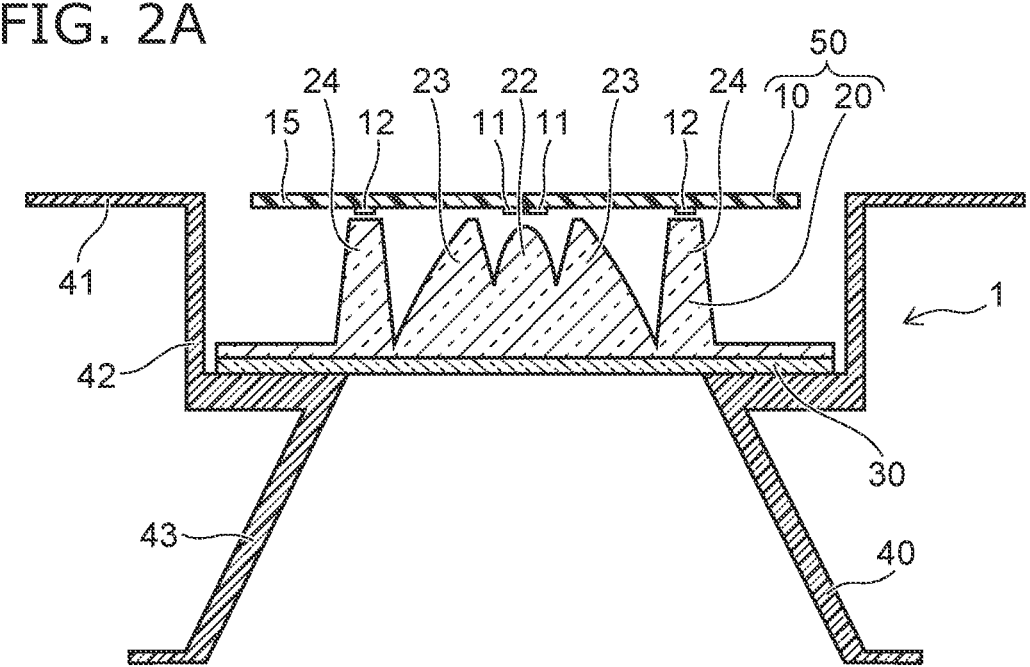
FIG. 2A is an end view showing the lighting device according to the first embodiment.

FIG. 2A is an end view showing the lighting device according to the present embodiment.

Figure 2B:
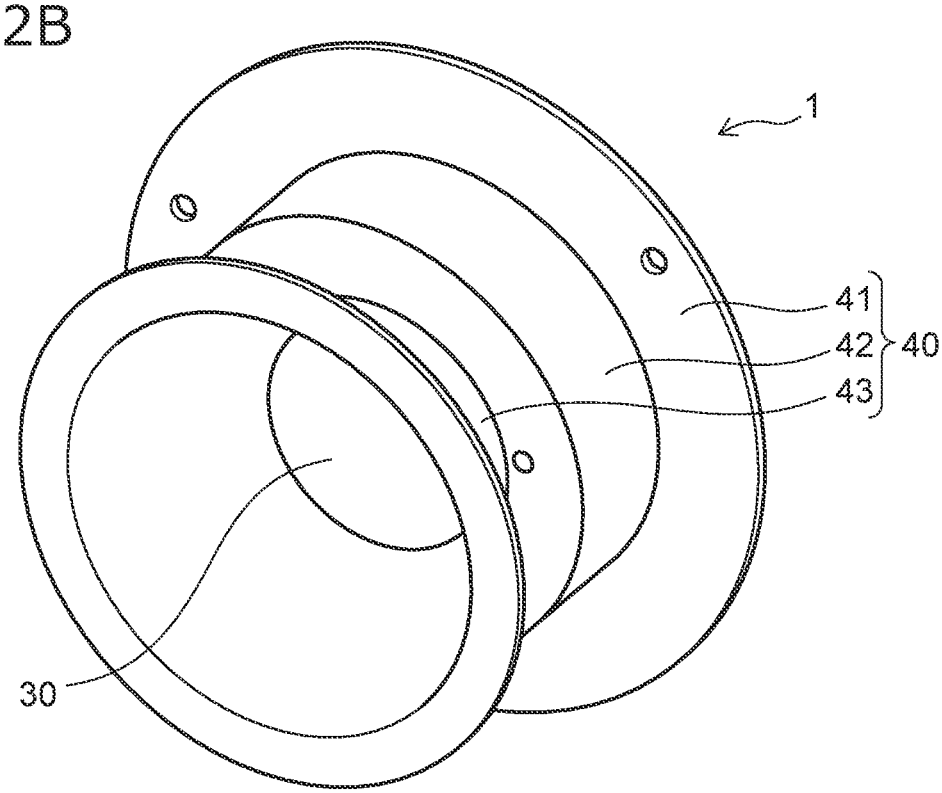
FIG. 2B is a perspective view showing the lighting device according to the first embodiment.

FIG. 2B is a perspective view showing the lighting device according to the present embodiment.

First, the configuration of the lighting device 1 according to the present embodiment will be summarily described. The lighting device 1 includes a light source portion 10, an optical member 20, a diffuser plate 30, and a cover member 40. A light-emitting device 50 includes the light source portion 10 and the optical member 20.

The light source portion 10 includes one or more first light-emitting elements 11 and one or more second light-emitting elements 12. The optical member 20 includes a first light condenser 22, a second light condenser 23, and a first light guide portion 24. The first light condenser 22 is disposed at a position corresponding to the first light-emitting element 11, and condenses the light incident from the first light-emitting element 11. The second light condenser 23 surrounds the first light condenser 22, and condenses light emitted from the first light-emitting element 11 and not incident on the first light condenser 22. The first light guide portion 24 is disposed at a position corresponding to the second light-emitting element 12 while surrounding the second light condenser 23, and guides the light incident from the second light-emitting element 12 by causing total reflection in the interior of the first light guide portion 24. The full width at half maximum (hereinafter referred to as "FWHM") of the light emitted from the first light guide portion 24 is larger than the FWHM of the light emitted from the first light condenser 22.

The diffuser plate 30 is positioned such that the light having been emitted from the light source portion 10 and having passed through the optical member 20 is incident. The cover member 40 is disposed at a position covering the lateral surfaces of the light-emitting device 50 and the diffuser plate 30. The cover member 40 has a substantially tubular configuration, and reflects a portion of the light having passed through the diffuser plate 30 at the inner surface of the cover member 40.

Details will now be described.

Figure 3:
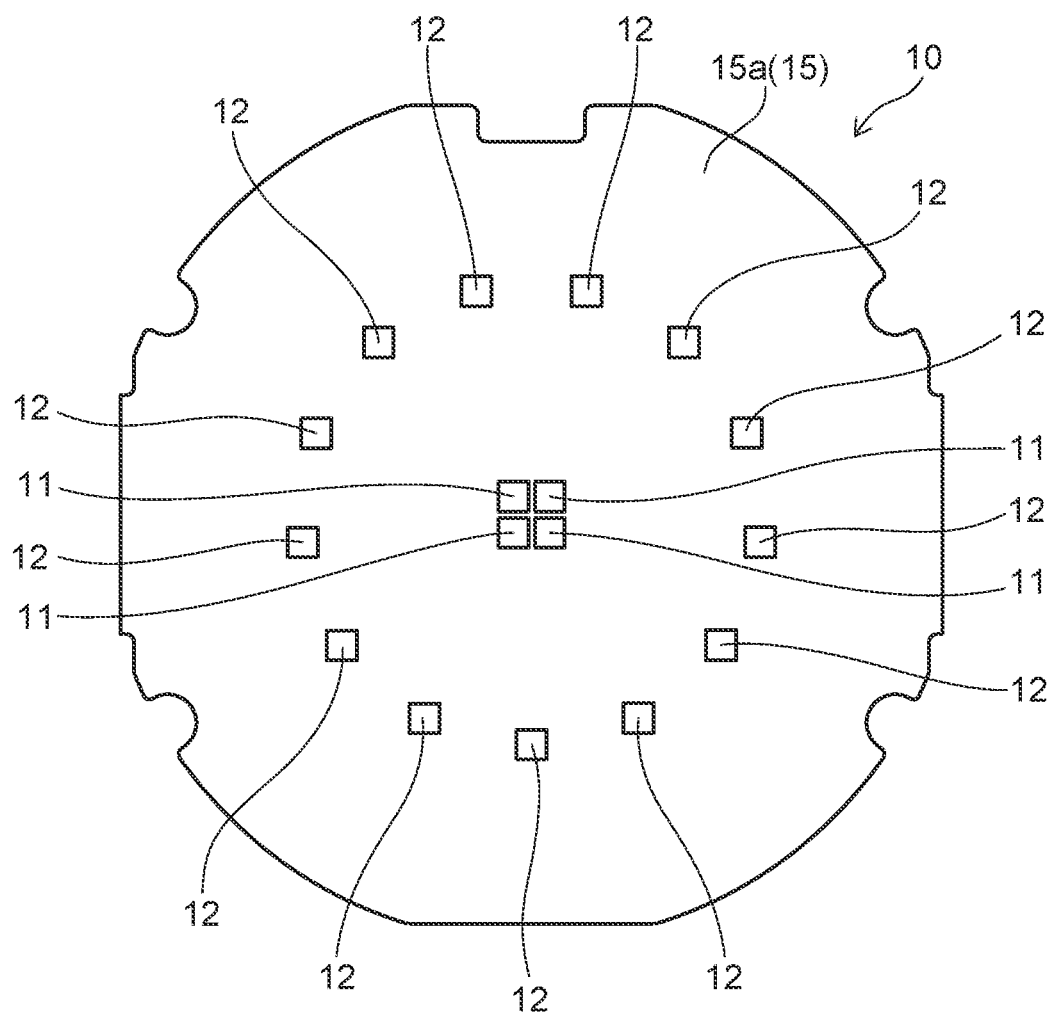
FIG. 3 is a plan view showing a light source portion.

FIG. 3 is a plan view showing the light source portion 10.

One wiring substrate 15 is provided in the light source portion 10. Although an example is illustrated in which the wiring substrate 15 has substantially a disk configuration, this is not requirement. In the wiring substrate 15, for example, wiring is provided inside a base material formed using a resin material. The first light-emitting element 11 and the second light-emitting element 12 are mounted on a mounting surface 15a of the wiring substrate 15.

For example, four first light-emitting elements 11 are disposed at the central vicinity of the wiring substrate 15. For example, thirteen second light-emitting elements 12 are arranged in a region surrounding the four first light-emitting elements 11 to have a circular configuration. In the present embodiment, although an example is shown in which the number of the first light-emitting elements 11 is 4 and the number of the second light-emitting elements 12 is 13, this is not requirement. There is no requirement for the numbers as long as the first light-emitting elements 11 are disposed at the central vicinity of the wiring substrate 15, and the second light-emitting elements 12 are arranged to surround the first light-emitting elements 11. The first light-emitting element 11 and the second light-emitting element are, for example, Light-Emitting Diodes (LEDs). The first light-emitting element 11 and the second light-emitting element 12 can be switched ON independently from each other.

Figure 4A:
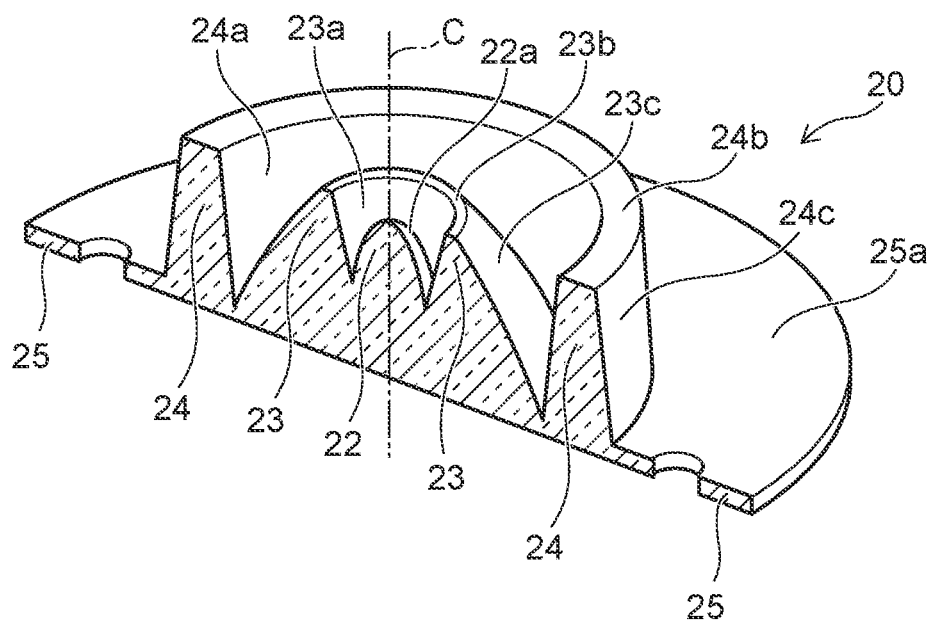
FIG. 4A is a perspective end view showing an optical member according to the first embodiment.

FIG. 4A is a perspective end view showing the optical member 20 according to the present embodiment.

Figure 4B:
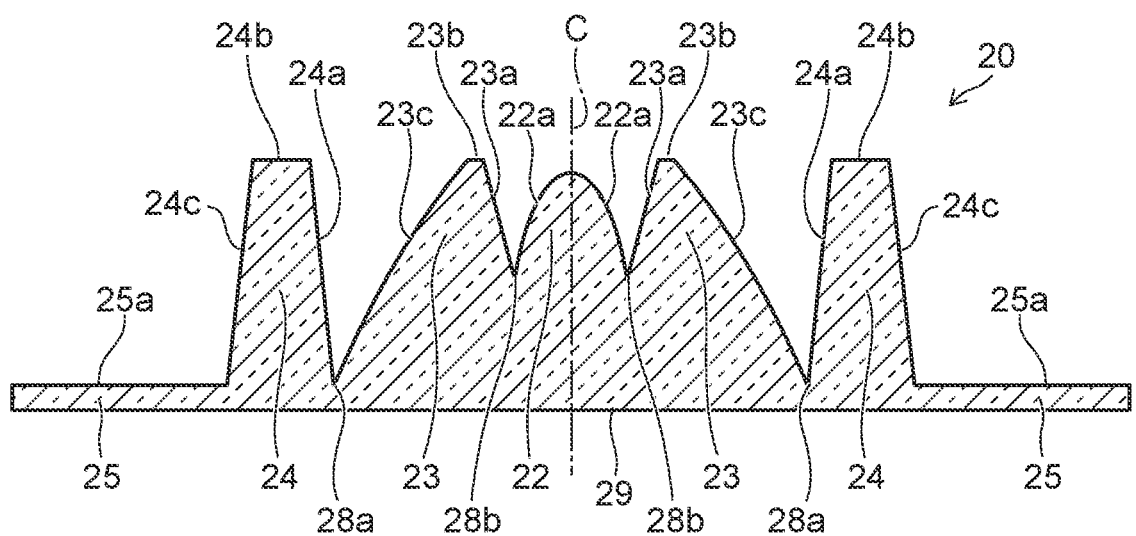
FIG. 4B is an end view showing the optical member according to the first embodiment.

FIG. 4B is an end view showing the optical member 20 according to the present embodiment.

Figure 5A:
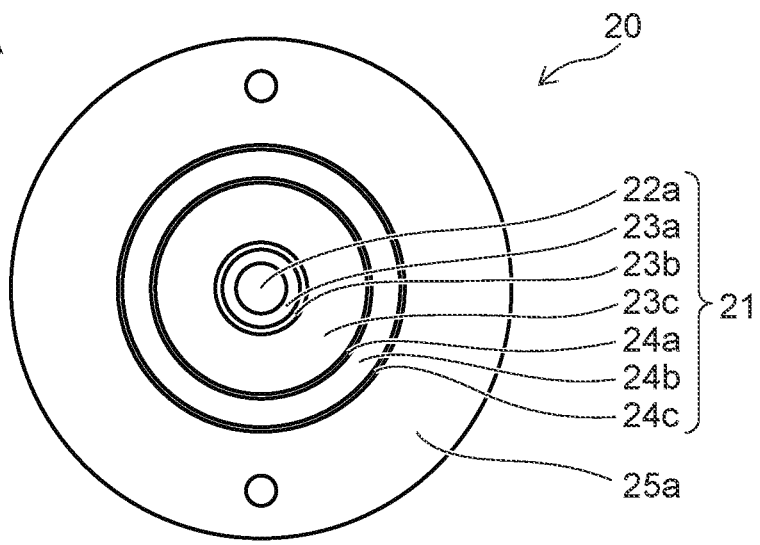
FIG. 5A is a plan view of the optical member according to the first embodiment when viewed from the light incident direction.

FIG. 5A is a plan view of the optical member 20 according to the present embodiment when viewed from the light incident direction.

Figure 5B:
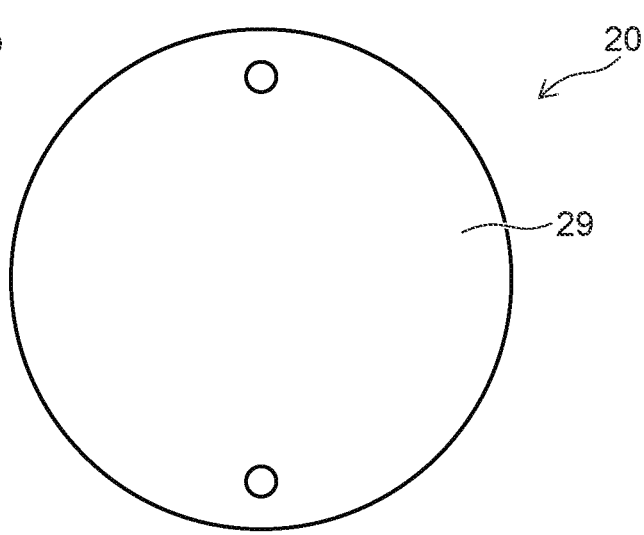
FIG. 5B is a plan view of the optical member according to the first embodiment when viewed from the light exiting direction.

FIG. 5B is a plan view of the optical member 20 according to the present embodiment when viewed from the light exiting direction.

Figure 5C:
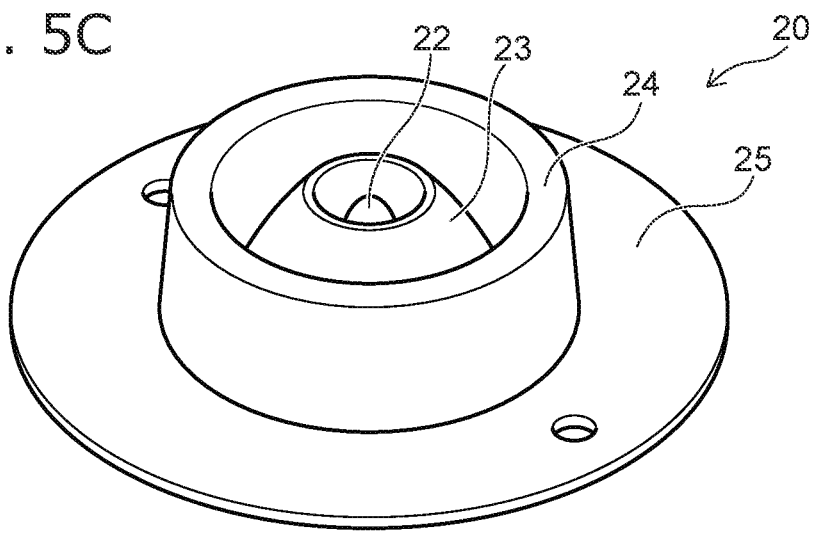
FIG. 5C is a perspective view showing the optical member according to the first embodiment.

FIG. 5C is a perspective view showing the optical member 20 according to the present embodiment.

The optical member 20 is a transparent member formed as one body of a transparent material. The configuration of the optical member 20 is substantially a rotated body having a central axis C as a rotation axis, and has light incident surfaces 21 and a light-exiting surface 29. The light incident surfaces 21 face the light source portion 10. As described below, the light incident surfaces 21 of the optical member 20 forms projections and depressions to configure uneven surface as the entire light incident surfaces. This surface unevenness can realize an optical function. The light-exiting surface is a plane substantially orthogonal to the central axis C. Hereinbelow, among the directions in which the central axis C of the optical member 20 extends, the direction from the light-exiting surface 29 toward the light incident surfaces 21 is called the "light incident direction"; and the direction from the light incident surfaces 21 toward the light-exiting surface 29 is called the "light exiting direction".

The first light condenser 22 that protrudes in the light incident direction is provided at the central portion of entire of the light incident surfaces 21. The first light condenser 22 is disposed at a position corresponding to the first light-emitting element 11 of the light source portion 10, and is disposed at, for example, a position facing the first light-emitting element 11. The first light condenser 22 has a convex lens configuration and is, for example, a portion of a rotated ellipsoid. An outer surface 22a of the first light condenser 22 is a convex curved surface. The minimum curvature radius of the outer surface 22a is not less than 0.3 mm and not more than 13 mm. For example, the minimum curvature radius of the outer surface 22a can be measured in a cross section including the central axis C.

The second light condenser 23 is provided so as to surround the first light condenser 22. The second light condenser 23 has a substantially truncated circular conical configuration having a flattened peak. The second light condenser 23 faces a region of the light source portion 10 between the first light-emitting element 11 and the second light-emitting element 12. The surface of the second light condenser 23 includes an inner surface 23a, an upper surface 23b, and an outer surface 23c.

The inner surface 23a contacts the outer surface 22a of the first light condenser 22, and is inclined away from the central axis C as approaching in the light incident direction. The upper surface 23b is positioned at the periphery of the inner surface 23a, and contacts the inner surface 23a. The upper surface 23b is a plane having a circular annular configuration parallel to the light-exiting surface 29. The outer surface 23c is positioned at the periphery of the upper surface 23b, and contacts the upper surface 23b. The outer surface 23c is inclined away from the central axis C as approaching in the light exiting direction. The outer surface 23c is curved outward with respect to the light-exiting surface 29, that is, convex toward the light incident direction. The minimum curvature radius of the outer surface 23c is not less than 0.6 mm and not more than 28 mm. The minimum curvature radius of the outer surface 23c also can be measured at, for example, a cross section including the central axis C.

The first light guide portion 24 is provided to surround the second light condenser 23. The first light guide portion 24 has a tubular configuration surrounding the periphery of the second light condenser 23 in an annular configuration. The cross-sectional configuration of the first light guide portion 24 is a trapezoid in a plane perpendicular to the light-exiting surface 29, for example, a plane elongated in the central axis C. The surface of the first light guide portion 24 includes an inner surface 24a, an upper surface 24b, and an outer surface 24c.

The inner surface 24a contacts the outer surface 23c of the second light condenser 23, and is inclined away from the central axis C as approaching in the light incident direction. A boundary line 28a between the outer surface 23c of the second light condenser 23 and the inner surface 24a of the first light guide portion 24 is positioned further in the light exiting direction than a boundary line 28b between the outer surface 22a of the first light condenser 22 and the inner surface 23a of the second light condenser 23. In other words, the distance between the boundary line 28a and the light-exiting surface 29 is shorter than the distance between the boundary line 28b and the light-exiting surface 29.

The upper surface 24b is disposed at the periphery of the inner surface 24a and contacts the inner surface 24a. The upper surface 24b is a plane having a circular ring configuration parallel to the light-exiting surface 29. The upper surface 24b is positioned so as to correspond to the second light-emitting element 12 of the light source portion 10, and, for example, so as to face the second light-emitting element 12. The upper surface 23b of the second light condenser 23 and the upper surface 24b of the first light guide portion 24 are positioned in the same plane. The outer surface 24c may be perpendicular to the light-exiting surface 29, or may be inclined away from the central axis C as approaching in the light exiting direction.

A flat plate portion 25 is provided at the periphery of the first light guide portion 24. It is sufficient for the configuration of the flat plate portion 25 to surround the periphery of the first light guide portion 24. It is preferable for the flat plate portion 25 to have a circular annular plate configuration. An upper surface 25a of the flat plate portion 25 is parallel to the light-exiting surface 29 of the optical member 20, and is a plane substantially orthogonal to the central axis C.

The light incident surfaces 21 is positioned and angled so as to be viewed directly from the light exiting direction. In other words, all of the outer surface 22a of the first light condenser 22, the inner surface 23a, the upper surface 23b, the outer surface 23c of the second light condenser 23, the inner surface 24a, the upper surface 24b, the outer surface 24c of the first light guide portion 24, and the upper surface 25a of the flat plate portion 25 all face the light-exiting surface 29. Therefore, the optical member 20 can be made by injection molding, etc. For example, the optical member 20 can be molded by pouring a transparent resin into a mold opening on the light-exiting surface 29 side, curing the transparent resin, and withdrawing the transparent resin in the light exiting direction.

The diffuser plate 30 is formed using a transparent material, for example, glass or a resin material, and diffuses and transmits the incident light. For example, a fine unevenness may be formed in one or both surfaces of the diffuser plate 30. Alternatively, in the diffuser plate 30, a material that has a different refractive index from the base material may be dispersed in the base material. It is sufficient for the configuration of the diffuser plate 30 to cover the light-exiting surface 29. The diffuser plate 30 preferably has a disk configuration. The diffuser plate 30 is disposed at the light-exiting surface 29 side of the optical member 20, and contacts, for example, the light-exiting surface 29.

The cover member 40 includes a flange 41, a housing 42, and a cone 43. The cover member 40 is formed of an opaque material, for example, a white resin material, a dark-colored resin material, or a metal material. The configuration of the cover member 40 is substantially a rotated body. The central axis of the cover member 40 substantially matches the central axis C of the optical member 20.

For example, the flange 41 has a circular annular plate configuration. The flange 41 is a portion for fixing the lighting device 1 to a member subject to be fixed, for example, a ceiling 100 of a room. The housing 42 has a cylindrical configuration in which the entire upper surface and the central portion of the bottom surface are open. The housing 42 houses the light source portion 10, the optical member 20, and the diffuser plate 30 are placed in the interior of the housing 42. The outer perimeter portion of the diffuser plate 30 is interposed and fixed between the flat plate portion 25 of the optical member 20 and the bottom surface of the housing 42 of the cover member 40. The cone 43 has a truncated circular conical configuration having a diameter increasing as the distance from the housing 42 increases. The upper surface and the bottom surface of the cone 43 are open. The interior of the cone 43 communicates with the interior of the housing 42. When the cover member 40 is formed using a white material, the inner surface of the cone 43 diffusely reflects the light. When the cover member 40 is formed using a dark-colored material, the inner surface of the cone 43 absorbs the light.

Operations of the lighting device 1 according to the present embodiment will now be described.

Figure 6:
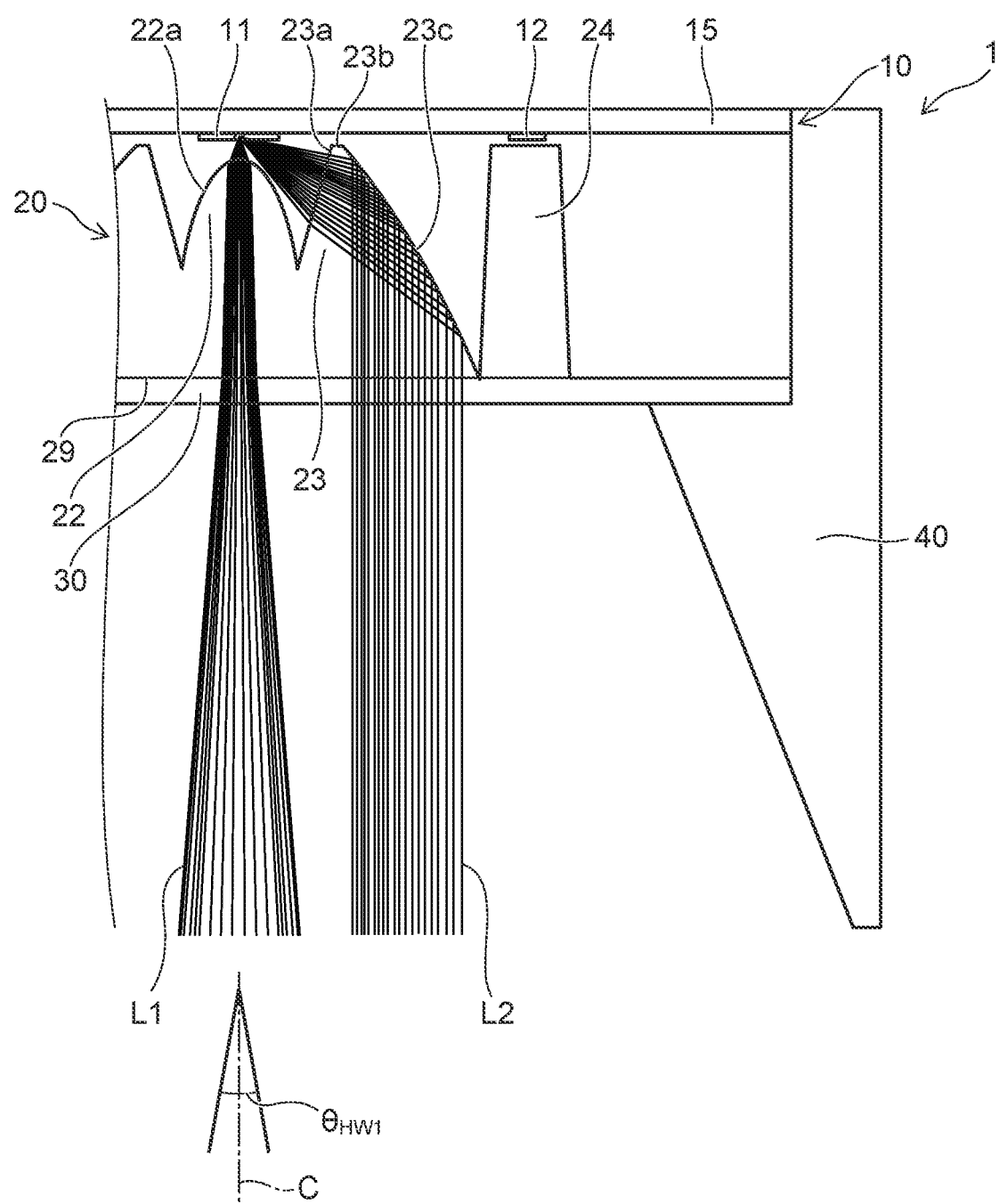
FIG. 6 shows simulation results of the path of the light emitted from a first light-emitting element.

FIG. 6 shows simulation results of the path of the light emitted from the first light-emitting element.

Figure 7:
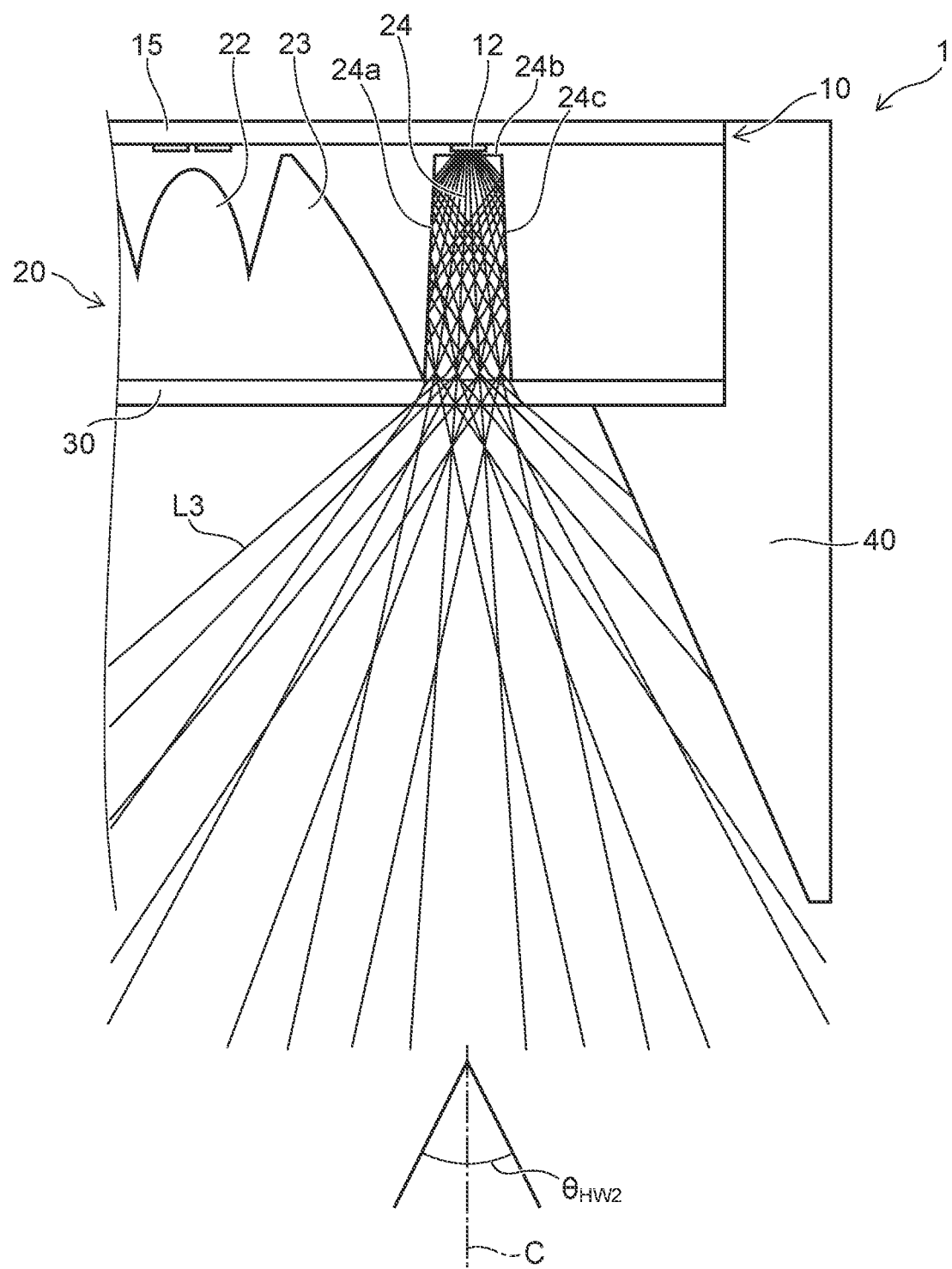
FIG. 7 shows simulation results of the path of the light emitted from a second light-emitting element.

FIG. 7 shows simulation results of the path of the light emitted from the second light-emitting element.

Figure 8:
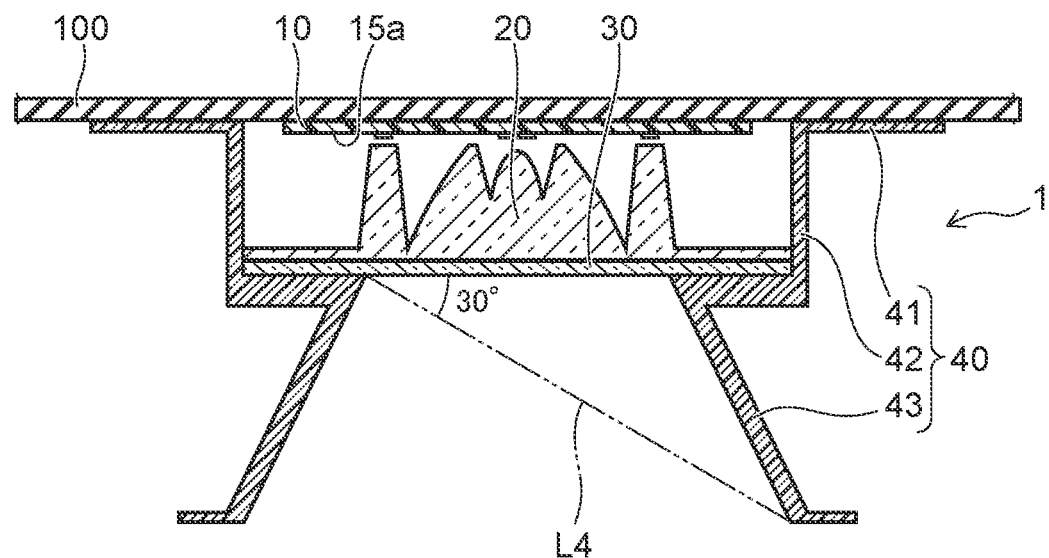
FIG. 8 is an end view showing a positional relationship between a cover member and the path of the light emitted from a diffuser plate.

FIG. 8 is an end view showing the positional relationship between the cover member and the path of the light exited from the diffuser plate.

When the first light-emitting element 11 is switched ON, a portion of the light emitted from the first light-emitting element 11 is incident on the outer surface 22a of the first light condenser 22 of the optical member 20. The outer surface 22a is a first light incident region where the light is incident on the first light condenser 22. Hereinbelow, the light that is incident on the first light condenser 22 is called "light L1". The light L1 is condensed by the first light condenser 22 having the convex lens configuration, and exits from the light-exiting surface 29. A FWHM $\theta_{HW1}$ of the light L1 exiting from the first light condenser 22 is, for example, 24°.

The remainder of the light emitted from the first light-emitting element 11, that is, the light that is emitted from the first light-emitting element 11 but is not incident on the first light condenser 22 is incident on the inner surface 23a of the second light condenser 23. Hereinbelow, the light that is incident on the second light condenser 23 is called "light L2." The light L2 passes through the second light condenser 23. At least a portion of the light L2 undergoes total reflection at the outer surface 23c, and exits from the light-exiting surface 29. The outer surface 23c is curved outward as approaching the light-exiting surface 29, the light L2 is condensed by undergoing total reflection at the outer surface 23c.

When the second light-emitting element 12 is switched ON, the greater part of the light emitted from the second light-emitting element 12 is incident on the upper surface 24b of the first light guide portion 24 of the optical member 20. The upper surface 24b is a second light incident region where the light is incident on the first light guide portion 24. Hereinbelow, the light that is incident on the first light guide portion 24 is called "light L3." At least a portion of the light L3 repeats total reflection at the inner surface 24a and the outer surface 24c of the first light guide portion 24, is guided through the interior of the first light guide portion 24 while diffusing, and thereafter exits from the light-exiting surface 29. A FWHM $\theta_{HW2}$ of the light L3 exiting from the first light guide portion 24 is, for example, 68°. The FWHM $\theta_{HW2}$ of the light L3 exiting from the first light guide portion 24 of the optical member 20 is larger than the FWHM $\theta_{HW1}$ of the light L1 exiting from the first light condenser 22. In other words, $\theta_{HW2} > \theta_{HW1}$.

Thus, when the first light-emitting element 11 is switched ON in the lighting device 1, the light L1 that is condensed by the first light condenser 22 and the light L2 that is condensed by the second light condenser 23 exit from the lighting device 1. Light that has a small FWHM can be obtained thereby. On the other hand, when the second light-emitting element 12 is switched ON, the light L3 that is diffused by the first light guide portion 24 exits from the lighting device 1. Light that has a large FWHM can be obtained thereby. Thus, the lighting device 1 can change the light distribution angle of the exiting light by switching between the light-emitting elements that are switched ON. Accordingly, the lighting device 1 can change the illumination area.

The light exiting from the light-exiting surface 29 of the optical member 20 is scattered when passing through the diffuser plate 30. Accordingly, the user is less likely to see the "grainy appearance" of the first light-emitting element 11 or the second light-emitting element 12 by seeing through the diffuser plate 30. Also, this can reduce the "uneven color" and the "glare" attributed to the angle of exiting light. Then, the light exiting from the diffuser plate 30 is incident on the cone 43 of the cover member 40. A portion of the light exiting from the diffuser plate 30 reaches the inner surface of the cone 43. In particular, the light traveling at an angle of 30° or less with respect to the mounting surface 15a of the wiring substrate 15 always reaches the inner surface of the cone 43. Light L4 shows the path of the light exiting from the end of the portion of the diffuser plate 30 exposed inside the cone 43. The Light L4 extends at an angle of 30° with respect to the mounting surface 15a, and passes through the central axis of the cone 43. The cone 43 is designed so that the light L4 is incident on the inner surface of the cone 43. When the inner surface of the cone 43 is formed using a white material, the light that reaches the inner surface of the cone 43 is diffusely reflected by the inner surface of the cone 43 and exits outside the lighting device 1. When the inner surface of the cone 43 is formed using a dark-colored material, the light that reaches the inner surface of the cone 43 is absorbed by the inner surface of the cone 43. Another portion of the light exiting from the diffuser plate 30 does not reach the inner surface of the cone 43 and exits directly outside the lighting device 1.

Effects of the present embodiment will now be described.

In the lighting device 1, the light distribution angle can be switched by electrical means without providing mechanical means. This can achieve reducing the size and the cost of manufacturing the lighting device 1. Because there is no mechanical operation, it can be realized to obtain the lighting device with extremely short switching time, no noise generation, and high reliability. The external appearance of the lighting device 1 does not suggest that switching of the light distribution angle is possible. Therefore, when the lighting deice 1 is mounted to the ceiling 100 of a room and used as a downlight, etc., the interior-stylishness can be improved.

The lighting device 1 can realize even further cost reduction as a lighting device because both the narrow-angle illumination and the wide-angle illumination can be performed using one optical member 20. As described above, the cost can further be reduced by forming the optical member 20 using injection molding technique, etc. Also, the use is less likely to notice discontinuity when switching the narrow-angle illumination from/to the wide-angle illumination because the position and the surface area of the light-emitting region substantially does not change between the narrow-angle illumination and the wide-angle illumination.

In the lighting device 1, a portion of the light that exits from the diffuser plate 30 and travels at an angle of 30° or less with respect to the mounting surface 15a of the wiring substrate 15 does not directly exit outside the lighting device 1 from the diffuser plate 30 because the light is diffusely reflected by the inner surface of the cone 43 when the cover member 40 is formed using a white material, or absorbed by the inner surface of the cone 43 when the cover member 40 is formed using a dark-colored material. Thereby, the light that is emitted from the first light-emitting elements 11 and the second light-emitting elements 12 at a shallow angle is less likely to directly enter the eyes of the user, and glare can be alleviated. Also, in the lighting device 1, the light exiting surface area can be reduced because the light L1 and L2 for narrow-angle illumination and the light L3 for wide-angle illumination can exit from one optical member 20. This can lower the height of the cone 43 while shielding the light at 30° or less, thus the entire lighting device 1 can be compact.

The first light-emitting elements 11 and the second light-emitting elements 12 may be switched ON simultaneously. Thereby, for example, a work space such as a desk, etc., can be illuminated to be brighter by the first light-emitting elements 11 while illuminating the entire room by the second light-emitting elements 12. In such a case, the color temperature of the light emitted by the first light-emitting elements 11 and the color temperature of the light emitted by the second light-emitting elements 12 may be different from each other. For example, the desk may be illuminated using white light by setting at 6500 K (Kelvin) as the color temperature of the light emitted from the first light-emitting elements 11 while illuminating the entire room with warm white light by setting at 2700 K as the color temperature of the light emitted from the second light-emitting elements 12.

The narrow-angle illumination and the wide-angle illumination may be switched by using a human detecting sensor. For example, the entire room may be illuminated by switching ON only the second light-emitting elements 12 when a human is not at the vicinity of a work space such as a desk, etc., or the work space may be illuminated by switching ON both the first light-emitting elements 11 and the second light-emitting elements 12 when the human is in the work space. Alternatively, for example, both the first light-emitting elements 11 and the second light-emitting elements 12 may be switched OFF when the room is vacant. Only the first light-emitting elements 11 may be switched ON to locally illuminate only the entrance vicinity when a human appears at the entrance of the room. When the human enters the room, the entire room may be brightly illuminated by switching ON both the first light-emitting elements 11 and the second light-emitting elements 12.

Second Embodiment

A second embodiment will now be described.

Figure 9:
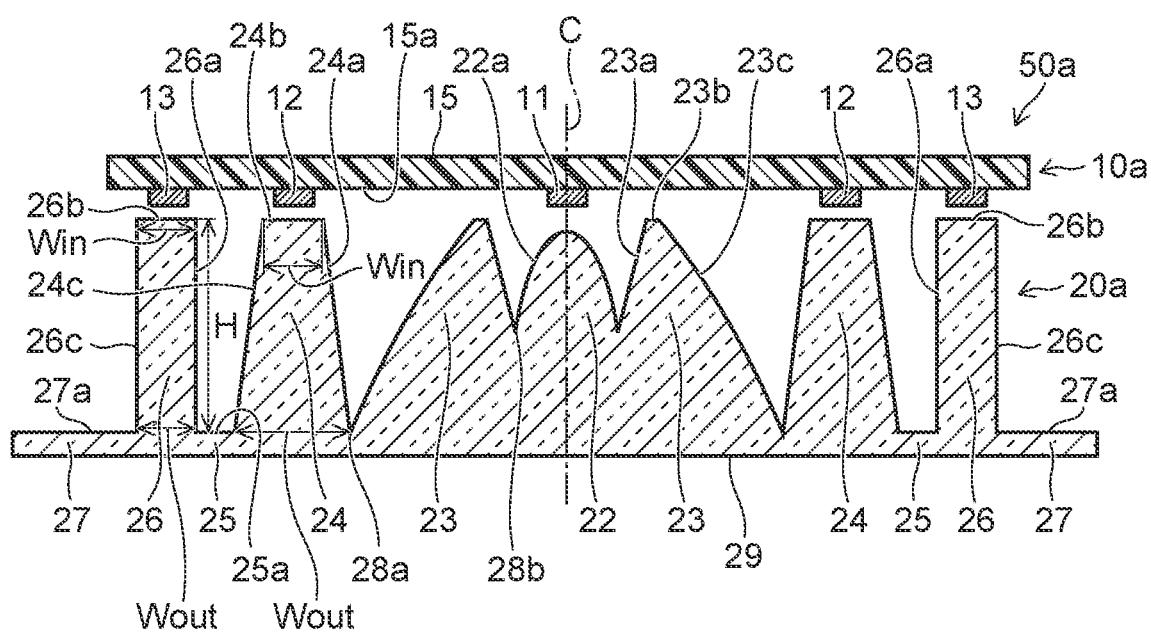
FIG. 9 shows a light-emitting device according to a second embodiment.

FIG. 9 shows a light-emitting device according to the present embodiment.

As a general rule in the following description, only the differences with the first present embodiment are described. Other than the following description, the present embodiment is similar to the first embodiment. This is similar for the other embodiments described below as well.

In addition to the configuration of the light-emitting device 50 according to the first embodiment, one or more third light-emitting elements 13 are provided in a light source portion 10a in the light-emitting device 50a according to the present embodiment, and a second light guide portion 26 and a flat plate portion 27 are provided in an optical member 20a.

For example, multiple third light-emitting elements 13 are arranged in a circular configuration in a region surrounding the region where the second light-emitting elements 12 are arranged on the mounting surface 15a of the wiring substrate 15. The third light-emitting element 13 is, for example, an LED. The third light-emitting element 13 can be switched ON independently from the first light-emitting element 11 and the second light-emitting element 12.

The second light guide portion 26 is provided at the outer side of the flat plate portion 25. The second light guide portion 26 is a transparent tubular member surrounding the periphery of the first light guide portion 24 in an annular configuration. The second light guide portion 26 is disposed at a position corresponding to the third light-emitting element 13, and is disposed at a position facing, for example, the third light-emitting element 13.

The surface of the second light guide portion 26 includes an inner surface 26a, an upper surface 26b, and an outer surface 26c. The inner surface 26a contacts the upper surface 25a of the flat plate portion 25. The inner surface 26a is, for example, parallel to the central axis C. The upper surface 26b is disposed at the periphery of the inner surface 26a, and contacts the inner surface 26a. The upper surface 26b is a plane having a circular annular configuration parallel to the light-exiting surface 29 and faces the third light-emitting element 13. The upper surface 26b is positioned in the same plane as the upper surface 23b of the second light condenser 23 and the upper surface 24b of the first light guide portion 24. The outer surface 26c contacts the upper surface 26b. The outer surface 26c is, for example, parallel to the central axis C. The cross-sectional configuration of the second light guide portion 26 is a rectangle in a plane perpendicular to the light-exiting surface 29, for example, a plane including the central axis C. Other than a rectangle, the cross-sectional configuration of the second light guide portion 26 may be a trapezoid.

The taper angles, in other words, the angles with respect to the central axis C, of the inner surface 26a and the outer surface 26c of the second light guide portion 26 are smaller than the taper angles of the inner surface 24a and the outer surface 24c of the first light guide portion 24. Accordingly, the taper ratio of the second light guide portion 26 is smaller than the taper ratio of the first light guide portion 24. The "taper ratio" of the light guide portion is the value defined as (Wout−Win)/H, wherein the width of the end surface of the light guide portion on the light incident surfaces 21 side is taken as Win, the width of the end surface of the light guide portion on the light-exiting surface 29 side is taken as Wout, and the length along the central axis C of the light guide portion is taken as H. The end surface of the first light guide portion 24 on the light incident surfaces 21 side is the upper surface 24b. The end surface of the first light guide portion 24 on the light-exiting surface 29 side is a plane connecting the boundary line 28a and the upper surface 25a of the flat plate portion 25. The end surface of the second light guide portion 26 on the light incident surfaces 21 side is the upper surface 26b. The end surface of the second light guide portion 26 on the light-exiting surface 29 side is a plane connecting the upper surface 25a of the flat plate portion 25 and an upper surface 27a of the flat plate portion 27. The taper ratio of the first light guide portion 24 is, for example, greater than 0 and not more than 0.54. The taper ratio of the second light guide portion 26 is, for example, not less than 0 and not more than 0.1. Thereby, the FWHM of the light exiting from the second light guide portion 26 is larger than the FWHM of the light exiting from the first light guide portion 24.

The flat plate portion 27 is provided at the outer side of the second light guide portion 26. The upper surface 27a of the flat plate portion 27 is a plane having a circular annular configuration parallel to the light-exiting surface 29. The thickness of the flat plate portion 27 is, for example, substantially the same as the thickness of the flat plate portion 25. The optical member 20a that includes the second light guide portion 26 and the flat plate portion 27 is formed as one body of a transparent material.

Operations of the lighting device according to the present embodiment will now be described.

When the third light-emitting element 13 is switched ON, the greater part of the light emitted from the third light-emitting element 13 is incident on the upper surface 26b of the second light guide portion 26. The upper surface 26b is a third light incident region where the light is incident on the second light guide portion 26. At least a portion of the light incident on the second light guide portion 26 at the upper surface 26b repeats total reflection at the inner surface 26a and the outer surface 26c, propagates through the second light guide portion 26, and exits from the light-exiting surface 29. A FWHM $\theta_{HW3}$ of the light exiting from the second light guide portion 26 is larger than the FWHM $\theta_{HW2}$ of the light exiting from the first light guide portion 24. In other words, $\theta_{HW3} > \theta_{HW2} > \theta_{HW1}$.

Effects of the present embodiment will now be described.

According to the present embodiment, light obtained by switching ON the third light-emitting element 13 can have a larger FWHM than those when switching ON the first light-emitting element 11 or the second light-emitting element 12. Thereby, the light distribution angle can be switched in three levels.

A lighting device according to an example will now be described.

Figure 10A:
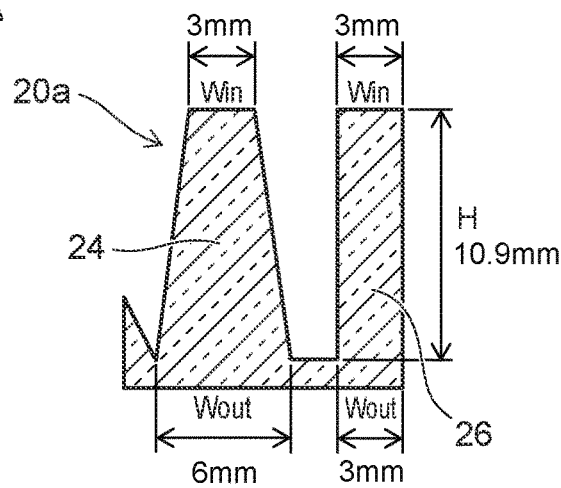
FIG. 10A shows dimensions of a first light guide portion and a second light guide portion of an example.

FIG. 10A shows dimensions of the first light guide portion 24 and the second light guide portion 26 of the example.

Figure 10B:
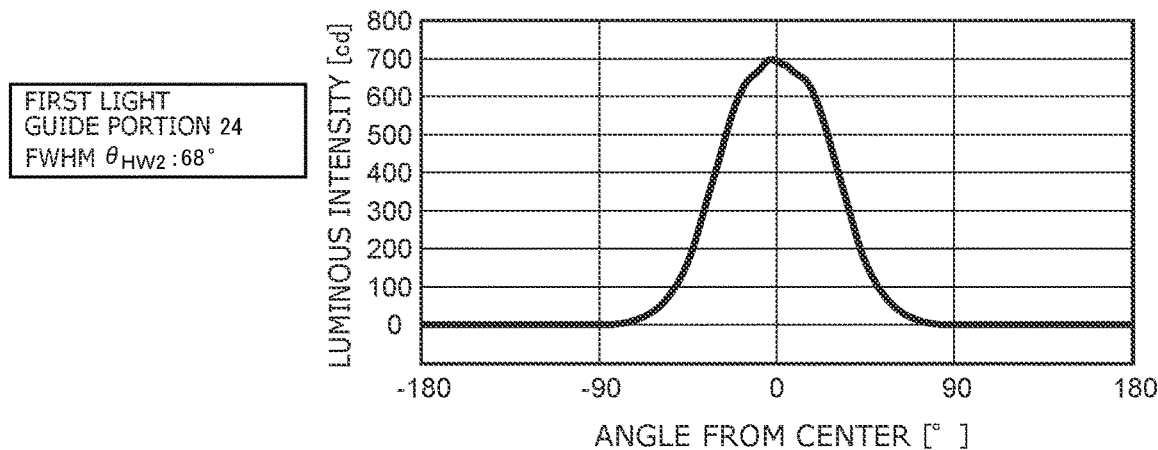
FIG. 10B is a graph showing simulation results of the distribution of the light emitted from the first light guide portion of the example, in which the horizontal axis represents the angle from the center, and the vertical axis represents the luminous intensity.

FIG. 10B is a graph showing simulation results of the distribution of the light exiting from the first light guide portion 24 of the example, in which the horizontal axis is the angle from the center, and the vertical axis is the luminous intensity.

Figure 10C:
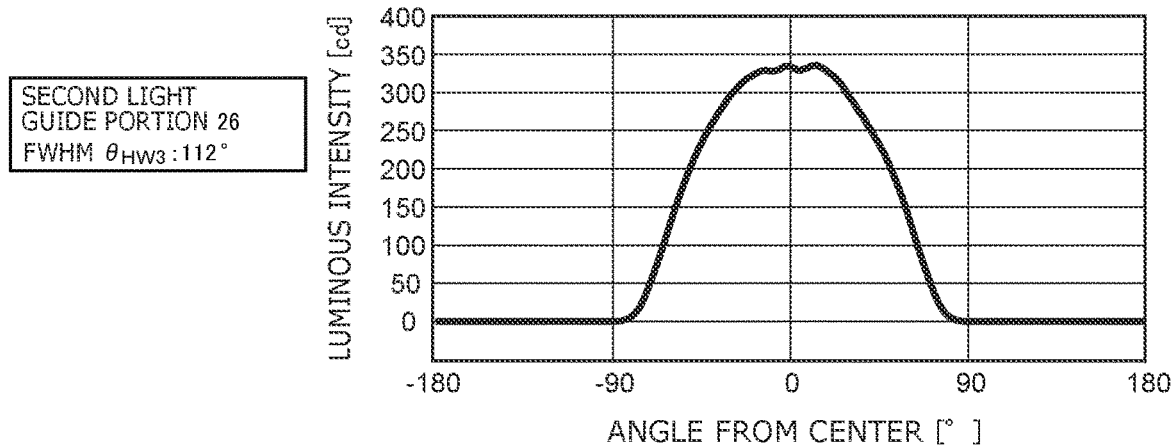
FIG. 10C is a graph showing simulation results of the distribution of the light emitted from the second light guide portion of the example, in which the horizontal axis represents the angle from the center, and the vertical axis represents the luminous intensity.

FIG. 10C is a graph showing simulation results of the distribution of the light emitted from the second light guide portion 26 of the example, in which the horizontal axis represents the angle from the center, and the vertical axis represents the luminous intensity.

For example, the FWHM $\theta_{HW2}$ is 68° when the width Win of the end portion of the first light guide portion 24 on the side from which light is incident is set to 3 mm, the width Wout of the end portion of the first light guide portion 24 on the side from which light exits is set to 6 mm, and the length H extending in the light exiting direction of the first light guide portion 24 is set to 10.9 mm. On the other hand, the FWHM $\theta_{HW3}$ is 112° when the width Win of the end portion of the second light guide portion 26 on the side from which the light is incident is set to 3 mm, the width Wout of the end portion of the second light guide portion 26 on the side from which light exits is set to 3 mm, and the length H extending in the light exiting direction of the second light guide portion 26 is set to 10.9 mm. As described above, the FWHM $\theta_{HW1}$ of the light L1 exiting from the first light condenser 22 is, for example, 24°. These values are shown collectively in Table 1 recited below.

TABLE 1

| | light-emitting element | | |
|---|---|---|---|
| | first light-emitting element 11 | second light-emitting element 12 | third light-emitting element 13 |
| | | transmitting portion | |
| | first light condenser 22 | first light guide portion 24 | second light guide portion 26 |
| FWHM [°] | 24 | 68 | 112 |

Third Embodiment

A third embodiment will now be described.

Figure 11:
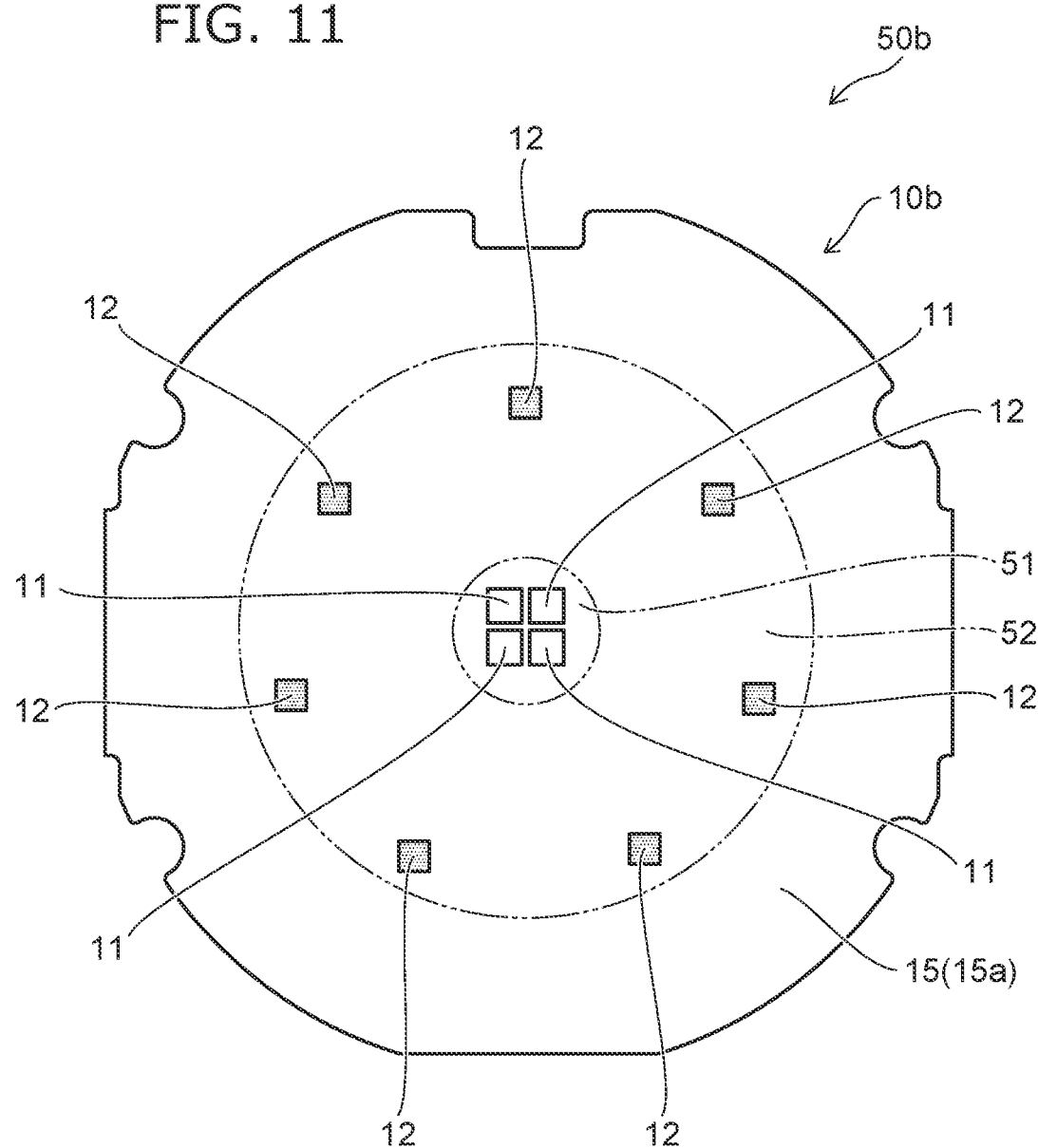
FIG. 11 is a plan view showing a light source portion of a third embodiment.

FIG. 11 is a plan view showing a light source portion of the present embodiment.

Figure 12:
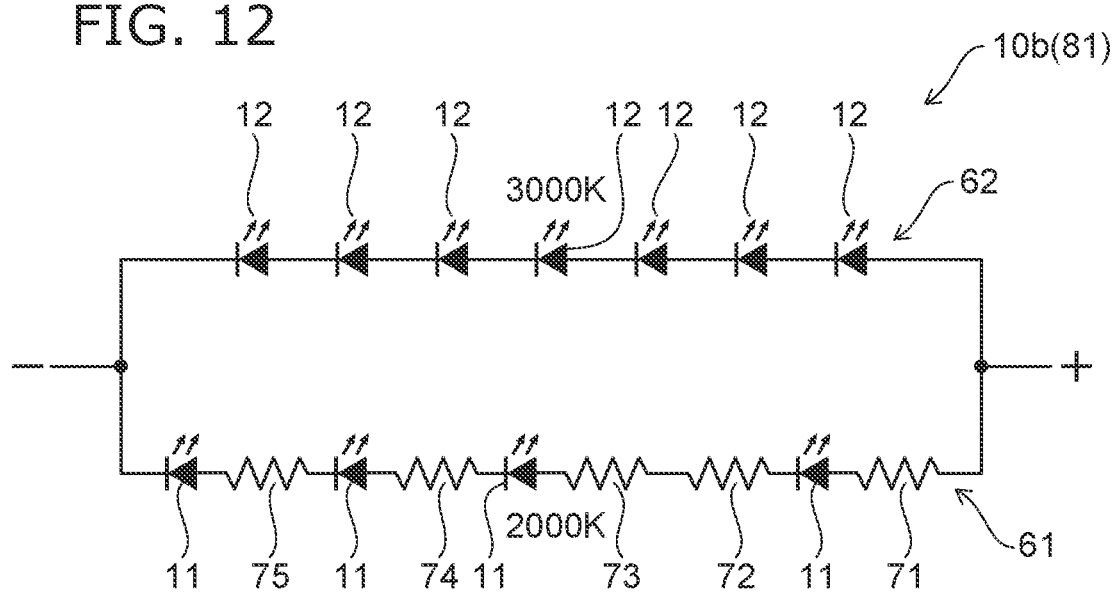
FIG. 12 is a circuit diagram showing a light-emitting circuit according to the third embodiment.

FIG. 12 is a circuit diagram showing a light-emitting circuit according to the present embodiment.

The light source portion 10b of a light-emitting device 50b according to the present embodiment includes the light-emitting circuit 81. The light-emitting circuit 81 includes one or more first light-emitting elements 11 disposed in a first region 51, and one or more second light-emitting elements 12 disposed in a second region 52. The second region 52 surrounds the first region 51. The color temperature of the light emitted from the second light-emitting element 12 is different from the color temperature of the light emitted from the first light-emitting element 11. In the light-emitting circuit 81, a first circuit 61 that includes the one or more first light-emitting elements 11 and a second circuit 62 that includes the one or more second light-emitting elements 12 are connected in parallel to each other. The number of stages of the first light-emitting elements 11 connected in series in the first circuit 61 is less than the number of stages of the second light-emitting elements 12 connected in series in the second circuit 62.

For example, four first light-emitting elements 11 are disposed in the first region 51 positioned at the central vicinity of the wiring substrate 15. For example, the first region 51 includes the center of the wiring substrate 15. For example, seven second light-emitting elements 12 are arranged in a circular configuration in the second region 52 so as to surround the first region 51. The first light-emitting elements 11 and the second light-emitting elements 12 are, for example, LEDs.

For example, the first light-emitting element 11 emits light having a color temperature of 2000 K (Kelvin). For example, the first circuit 61 is configured by connecting the four first light-emitting elements 11 with, for example, five resistance elements 71 to 75 via wiring of the wiring substrate 15, in a series connection. In the example shown in FIG. 12, the first circuit 61 is configured by connecting the resistance element 71, the first light-emitting element 11, the resistance element 72, the resistance element 73, the first light-emitting element 11, the resistance element 74, the first light-emitting element 11, the resistance element 75, and the first light-emitting element 11, in a series connection in order from the positive side toward the negative side. In other words, in the first circuit 61, the total number of the first light-emitting elements 11 is 4, and the number of stages of the first light-emitting elements 11 connected in series also is 4. The anodes of the first light-emitting elements 11 are connected to the positive side, and the cathodes of the first light-emitting elements 11 are connected to the negative side.

For example, the second light-emitting element 12 emits light having a color temperature of 3000 K. The second circuit 62 is configured by connecting the second light-emitting elements 12 via wiring of the wiring substrate 15 in a series connection. In the second circuit 62 in the example shown in FIG. 12, for example, seven second light-emitting elements 12 are connected in series from the positive side toward the negative side without being interposed by resistance elements. In other words, in the second circuit 62, the total number of the second light-emitting elements 12 is 7, and the number of stages of the second light-emitting elements 12 connected in series also is 7. The anodes of the second light-emitting elements 12 is connected to the positive side, and the cathodes of the second light-emitting elements 12 is connected to the negative side.

In the light-emitting circuit 81, the positive-side terminal of the first circuit 61 and the positive-side terminal of the second circuit 62 are connected to each other, and the negative-side terminal of the first circuit 61 and the negative-side terminal of the second circuit 62 are connected to each other. Thereby, the first circuit 61 and the second circuit 62 are connected in parallel between the positive-side terminal and the negative-side terminal. Although an example is shown in FIG. 11 and FIG. 12 in which the number of the first light-emitting elements 11 is 4 and the number of the second light-emitting elements 12 is 7, this is not requirement. It is sufficient for the first light-emitting elements 11 to be disposed in the first region 51, for the second light-emitting elements 12 to be disposed in the second region 52 surrounding the first region 51. It is also sufficient for the number of stages of the first light-emitting elements 11 connected in series in the first circuit 61 to be less than the number of stages of the second light-emitting elements 12 connected in series in the second circuit 62.

Operations of the lighting device according to the present embodiment will now be described.

First, the operation of the light-emitting circuit 81 will be described.

Figure 13A:
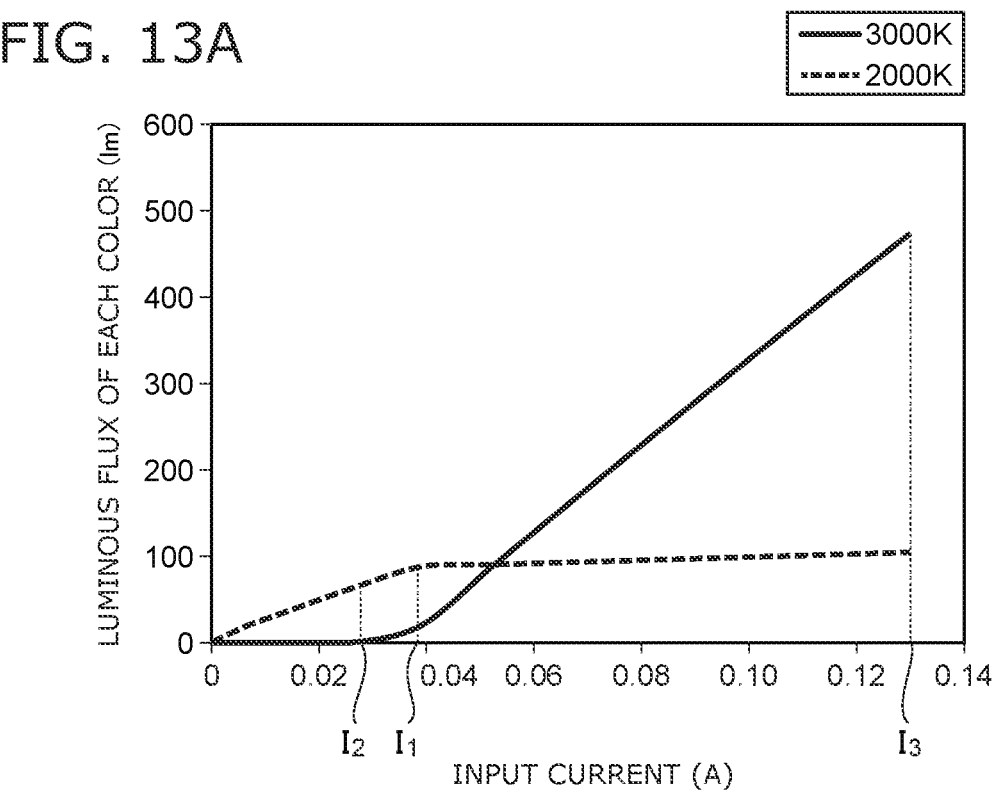
FIG. 13A is a graph showing the behavior of a first light-emitting element and a second light-emitting element of the third embodiment, in which the horizontal axis represents the input current, and the vertical axis represents the luminous flux.

FIG. 13A is a graph showing the behavior of the first light-emitting element and the second light-emitting element of the present embodiment, in which the horizontal axis represents the input current, and the vertical axis represents the luminous flux.

Figure 13B:
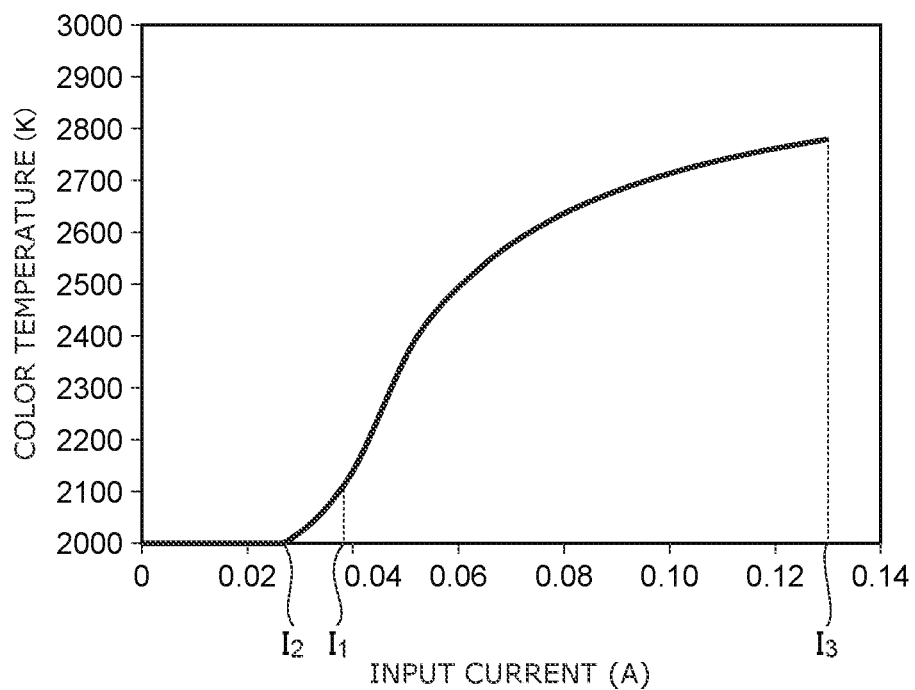
FIG. 13B is a graph showing the behavior of a light-emitting device according to the third embodiment, in which the horizontal axis represents the input current, and the vertical axis represents the color temperature.

FIG. 13B is a graph showing the behavior of the light-emitting device according to the present embodiment, in which the horizontal axis represents the input current, and the vertical axis represents the color temperature.

In the light-emitting circuit 81 as described above, the number of stages of the first light-emitting elements 11 connected in series in the first circuit 61 is less than the number of stages of the second light-emitting elements 12 connected in series in the second circuit 62. Therefore, when a direct current applied to the light-emitting circuit 81 is increased continuously from zero, initially, the first light-emitting elements 11 conduct firstly because the voltage applied between the anode-cathode of the first light-emitting elements 11 is higher than the voltage applied between the anode-cathode of the second light-emitting elements 12. Therefore, a current flows in only the first circuit 61, and a current substantially does not flow in the second circuit 62. Accordingly, only the first light-emitting elements 11 emit light, and light that has a color temperature of 2000 K is emitted. The luminous flux of the first light-emitting elements 11 increases as the input current is increased until the input current value reaches a value $I_1$ at which the current flowing in the first light-emitting elements 11 substantially saturates.

As the direct current applied to the light-emitting circuit 81 is increased, a current starts to flow in the second light-emitting elements 12 as well. The second light-emitting elements 12 also emit light thereby. The current value at which the second light-emitting elements 12 start to emit light is taken as $I_2$. When the current value is in the range not less than 0 and not more than $I_2$, the color temperature of the light is constant at 2000 K, and only the luminous flux changes according to the input current. It is preferable for the current value $I_2$ to be not more than the current value $I_1$. When the current value reaches or exceeds $I_2$, the light emitted from the light source portion 10b becomes the mixed light of the light emitted from the first light-emitting elements 11 and the light emitted from the second light-emitting elements 12, and the color temperature has a value between 2000 K and 3000 K. Then, as the input current value is increased until the input current value reaches a value $I_3$ at which the current flowing in the second light-emitting elements 12 saturates, the luminous flux of the second light-emitting elements 12 increases while the luminous flux of the first light-emitting elements 11 is substantially constant. The color temperature of the light emitted from the light source portion 10b also changes because the proportion of the luminous flux of the first light-emitting elements 11 and the luminous flux of the second light-emitting elements 12 changes. Accordingly, when the current value is in the range not less than $I_2$ and not more than $I_3$, as the input current is increased, the luminous flux increases, thus the color temperature of the light increases from 2000 K to converge to a prescribed value between 2000 K and 3000 K. The resistance values of the resistance elements 71 to 75 are adjusted so that the anode-cathode voltage of the first light-emitting elements and the anode-cathode voltage of the second light-emitting elements 12 are substantially equal when the current value reaches $I_3$.

Thus, in the light-emitting device 50b according to the present embodiment, when the first light-emitting element 11 is switched ON, light is emitted from the first region 51, and the light L1 that is condensed by the first light condenser 22 and the light L2 that is condensed by the second light condenser 23 are emitted from the light-emitting device 50b. Light that has a small FWHM can be obtained thereby. On the other hand, when the second light-emitting element 12 is switched ON, light is emitted from the second region 52, and the light L3 that is diffused by the first light guide portion 24 exits from the light-emitting device 50b. Light that has a large FWHM can be obtained thereby. Thus, in the light-emitting device 50b, adjusting the input current value can control the color temperature and the light distribution angle of the emitted light by changing the luminous flux of each light-emitting element.

Fourth Embodiment

A fourth embodiment will now be described.

Figure 14:
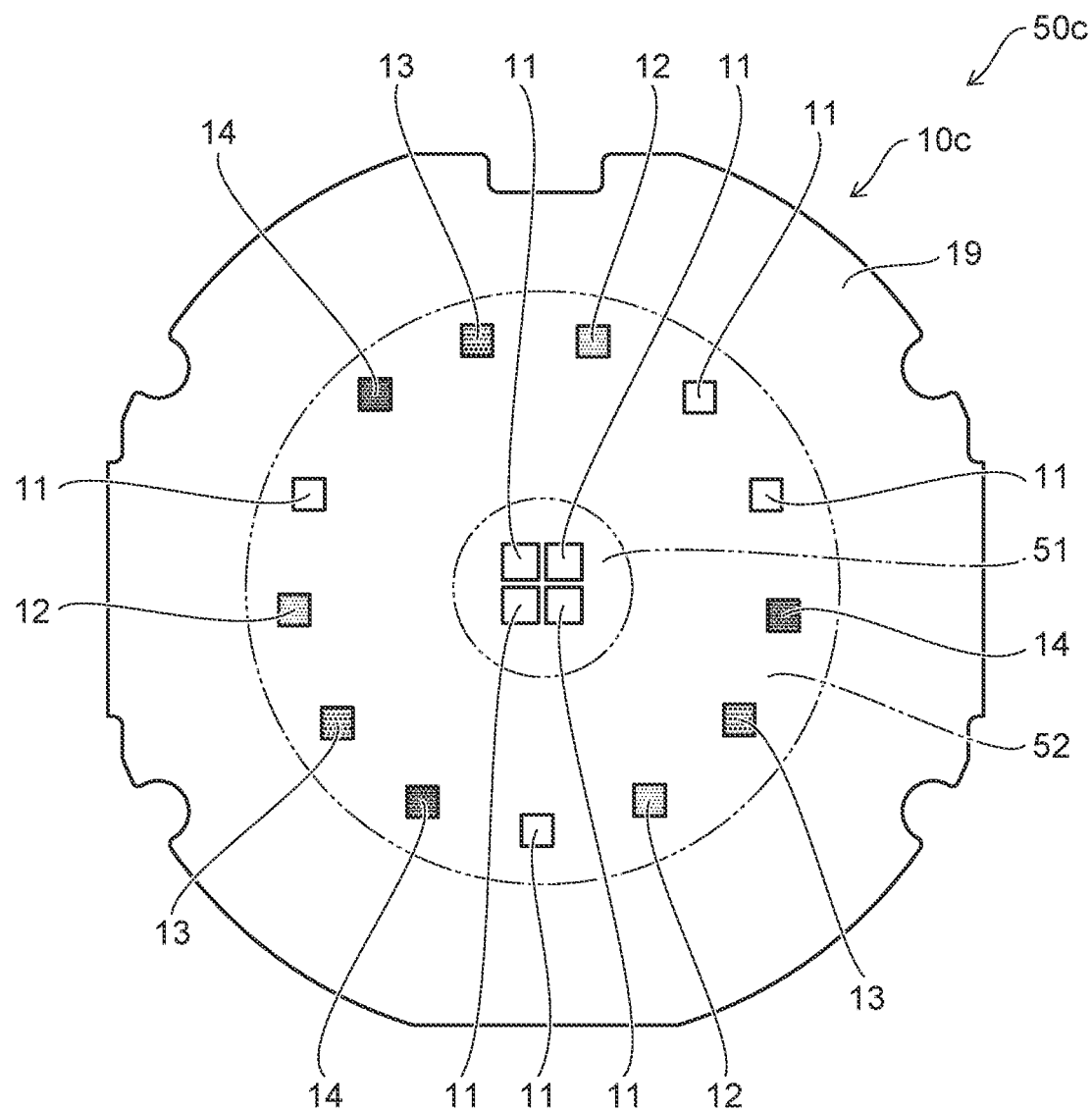
FIG. 14 is a plan view showing a light source portion of a fourth embodiment.

FIG. 14 is a plan view showing a light source portion of the present embodiment.

Figure 15:
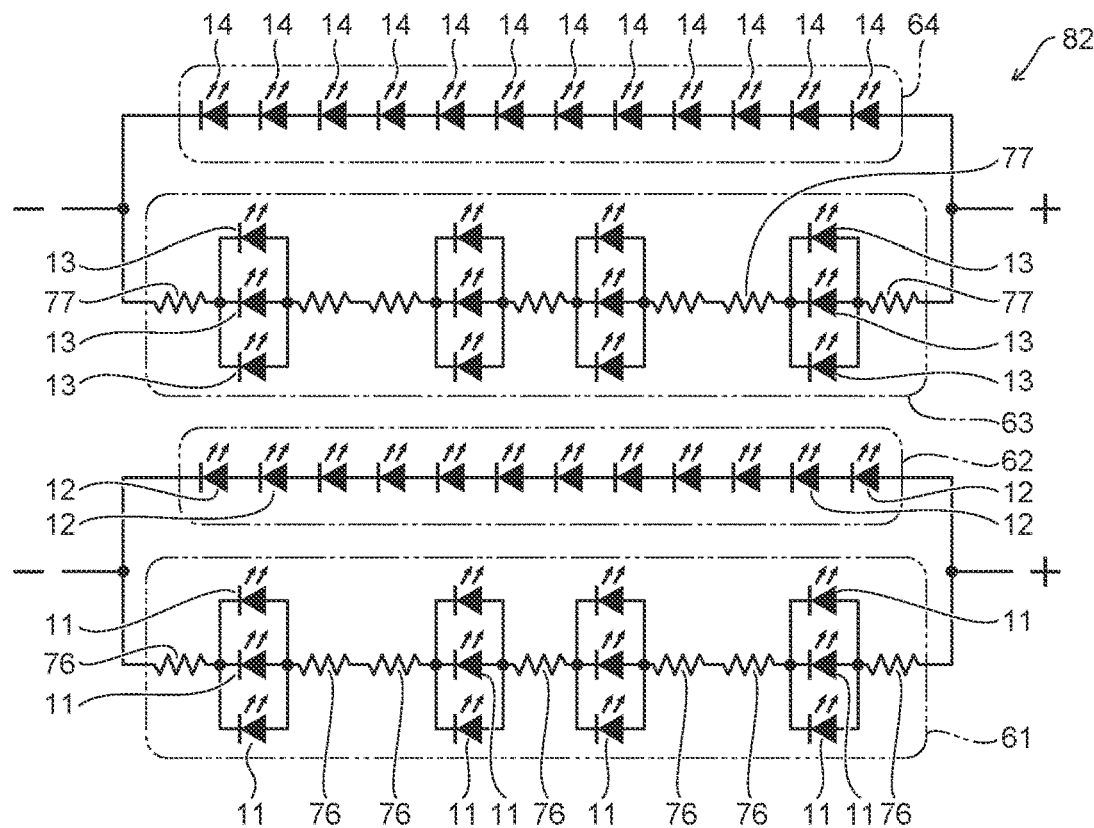
FIG. 15 is a circuit diagram showing a light-emitting circuit according to the fourth embodiment.

FIG. 15 is a circuit diagram showing a light-emitting circuit according to the present embodiment.

In the light source portion 10c of a light-emitting device 50c according to the present embodiment, one or more first light-emitting elements 11 is provided in the first region 51, and one or more first light-emitting elements 11, one or more second light-emitting elements 12, one or more third light-emitting elements 13, and one or more fourth light-emitting elements 14 are provide in the second region 52. In other words, the first light-emitting elements 11 is provided in both the first region 51 and the second region 52, and the second light-emitting elements 12, the third light-emitting elements 13, and the fourth light-emitting elements 14 are provided in only the second region 52. In FIG. 14, the number of the illustrated light-emitting elements is less than the actual number to simplify the drawing. In the example shown in FIG. 15, the total number of the first light-emitting elements 11, the total number of the second light-emitting elements 12, the total number of the third light-emitting elements 13, and the total number of the fourth light-emitting elements 14 each are 12.

In the present embodiment, for example, the color temperature of the light emitted from the first light-emitting element 11 is 2700 K, the color temperature of the light emitted from the second light-emitting element 12 is 2000 K; the color temperature of the light emitted from the third light-emitting element 13 is 3500 K; and the color temperature of the light emitted from the fourth light-emitting element 14 is 6500 K. The color temperature of the light emitted from the light-emitting elements is not required to be the example recited above, and it is sufficient for the color temperature of the light emitted from the first light-emitting element 11, the color temperature of the light emitted from the second light-emitting element 12, the color temperature of the light emitted from the third light-emitting element 13, and the color temperature of the light emitted from the fourth light-emitting element 14 to be different from each other.

A light-emitting circuit 82 is provided in the light source portion 10c. The light-emitting circuit 82 includes the first to fourth light-emitting elements described above, multiple first resistance elements 76, and multiple second resistance elements 77. The first circuit 61, the second circuit 62, a third circuit 63, and a fourth circuit 64 are provided in the light-emitting circuit 82. In the light-emitting circuit 82, the first circuit 61 and the second circuit 62 are connected in parallel to each other, and the third circuit 63 and the fourth circuit 64 are connected in parallel to each other.

In the first circuit 61 is, for example, a unit circuit configured by three first light-emitting elements 11 connected in parallel to each other, four unit circuits are provided, and the four unit circuits and the multiple first resistance elements 76 are connected in series. Accordingly, in the first circuit 61, the total number of the first light-emitting elements 11 is 12, and the number of stages of the first light-emitting elements 11 connected in series is 4. The resistance values may be the same or different between the multiple first resistance elements 76.

In the second circuit 62, for example, twelve second light-emitting elements 12 are connected in series without being interposed by resistance elements. Accordingly, in the second circuit 62, the total number of the second light-emitting elements 12 is 12, and the number of stages of the second light-emitting elements 12 connected in series also is 12.

In the third circuit 63, for example, a unit circuit is configured by three third light-emitting elements 13 connected in parallel to each other, four unit circuits are provided, and the four unit circuits and the multiple second resistance elements 77 are connected in series. Accordingly, in the third circuit 63, the total number of the third light-emitting elements 13 is 12; and the number of stages of the third light-emitting elements 13 connected in series is 4. The resistance values may be the same or different between the multiple second resistance elements 77.

In the fourth circuit 64, for example, twelve fourth light-emitting elements 14 are connected in series without being interposed by resistance elements. Accordingly, in the fourth circuit 64, the total number of the fourth light-emitting elements 14 is 12, and the number of stages of the fourth light-emitting elements 14 connected in series is 12.

Operations of the present embodiment will now be described.

The first light-emitting elements 11 are disposed in both the first region 51 and the second region 52, and thus the light that is emitted from the first light-emitting elements 11 exits from the first light condenser 22, the second light condenser 23, and the first light guide portion 24 of the optical member 20. The second light-emitting elements 12, the third light-emitting elements 13, and the fourth light-emitting elements 14 are disposed in only the second region 52, and thus the light that is emitted from the second light-emitting elements 12, the third light-emitting elements 13, and the fourth light-emitting elements 14 exits from the first light guide portion 24.

The first circuit 61 and the second circuit 62 are connected to the same power supply, and have the same voltage applied. Thereby, as described in the first embodiment, when the input current value is increased gradually from zero, the first light-emitting elements 11 start to emit light firstly, and the second light-emitting elements 12 start to emit light about when the current flowing in the first light-emitting elements 11 saturates. As a result, as the input current value is changed, the color temperature, the luminous flux, and the light distribution angle of the entirety change according to a prescribed relationship.

The third circuit 63 and the fourth circuit 64 are connected to the same power supply, and have the same voltage applied. Thereby, when the input current value is increased gradually from zero, the third light-emitting elements 13 start to emit light firstly; and the fourth light-emitting elements 14 start to emit light about when the current flowing in the third light-emitting elements 13 saturates. As a result, when the input current value is changed, the color temperature and the luminous flux of the entirety change according to a prescribed relationship.

The ratio of the light emitted from the first light-emitting elements 11, the second light-emitting elements 12, the third light-emitting elements 13, and the fourth light-emitting elements 14 can be controlled by controlling the ratio of the current value flowing in the first circuit 61 and the second circuit 62 and the current value flowing in the third circuit 63 and the fourth circuit 64. By suitably adjusting this control, the color of the light emitted from the light-emitting device 50c can be changed to follow blackbody radiation.

Figure 16:
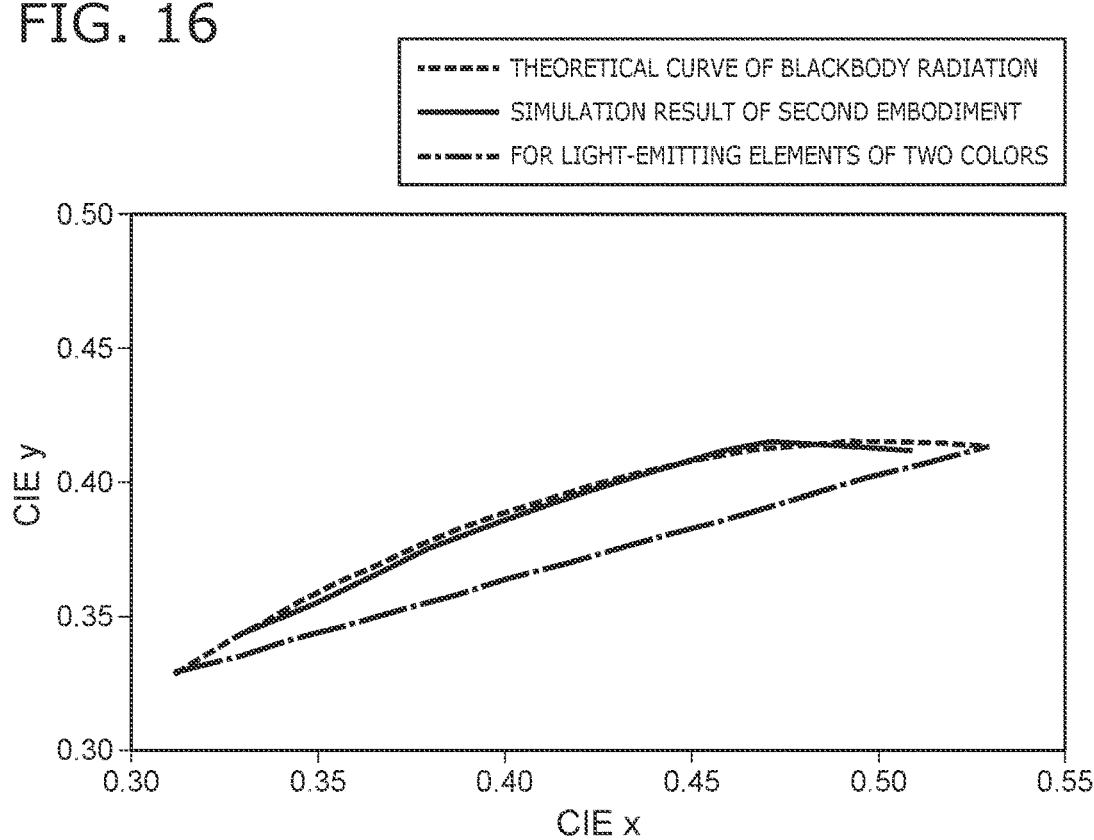
FIG. 16 is a chromaticity coordinates diagram showing the change of the color of the light emitted from a light-emitting device, in which the horizontal axis represents x, and the vertical axis represents y.

FIG. 16 is a chromaticity coordinates diagram showing the change of the color of the light emitted from the light-emitting device, in which the horizontal axis represents x, and the vertical axis represents y.

In FIG. 16, the curve shown by the broken line is the theoretical curve of the color change of blackbody radiation, the curve shown by the solid line represents the simulation results of the color change of the light emitted by the light-emitting device according to the present embodiment, and the straight line shown by the single dot-dash line represents the color change of the light emitted by a light-emitting device using only two types of light-emitting elements.

According to the present embodiment as shown in FIG. 16, the light that is emitted from the light-emitting device 2 can be changed to follow blackbody radiation.

Effects of the present embodiment will now be described.

According to the present embodiment, four types of light-emitting elements having mutually-different color temperatures are provided, therefore, the adjustment range of the color temperature is wide compared to the third embodiment. The first circuit 61 that includes the first light-emitting elements 11 and the second circuit 62 that includes the second light-emitting elements 12 are connected in parallel to each other. The number of stages of the first light-emitting elements 11 connected in series in the first circuit 61 is less than the number of stages of the second light-emitting elements 12 connected in series in the second circuit 62. Therefore, the state in which the first light-emitting elements 11 emit light solitarily can transition smoothly and continuously to the state in which both the first light-emitting elements 11 and the second light-emitting elements 12 emit light. Similarly, the third circuit 63 that includes the third light-emitting elements 13 and the fourth circuit 64 that includes the fourth light-emitting elements 14 are connected in parallel to each other. The number of stages of the third light-emitting elements 13 connected in series in the third circuit 63 is less than the number of stages of the fourth light-emitting elements 14 connected in series in the fourth circuit 64. Therefore, the state in which the third light-emitting elements 13 emit light solitarily can transition smoothly and continuously to the state in which both the third light-emitting elements 13 and the fourth light-emitting elements 14 emit light.

The state in which the first light-emitting elements 11 emit light solitarily can transition smoothly and continuously to the state in which all of the light-emitting elements emit light by appropriately controlling the current value flowing in the circuit in which the first circuit 61 and the second circuit 62 are connected in parallel and the current value flowing in the circuit in which the third circuit 63 and the fourth circuit 64 are connected in parallel. Thereby, the color temperature, the luminous flux, and the light distribution angle can be changed continuously, so that the user is less likely to feel awkwardness when controlling the light. Also, it is possible to change the color of the light to follow blackbody radiation. Thereby, more natural light control is possible; and a comforting feeling can be provided to the user.

Fifth Embodiment

A fifth embodiment will now be described.

Figure 17:
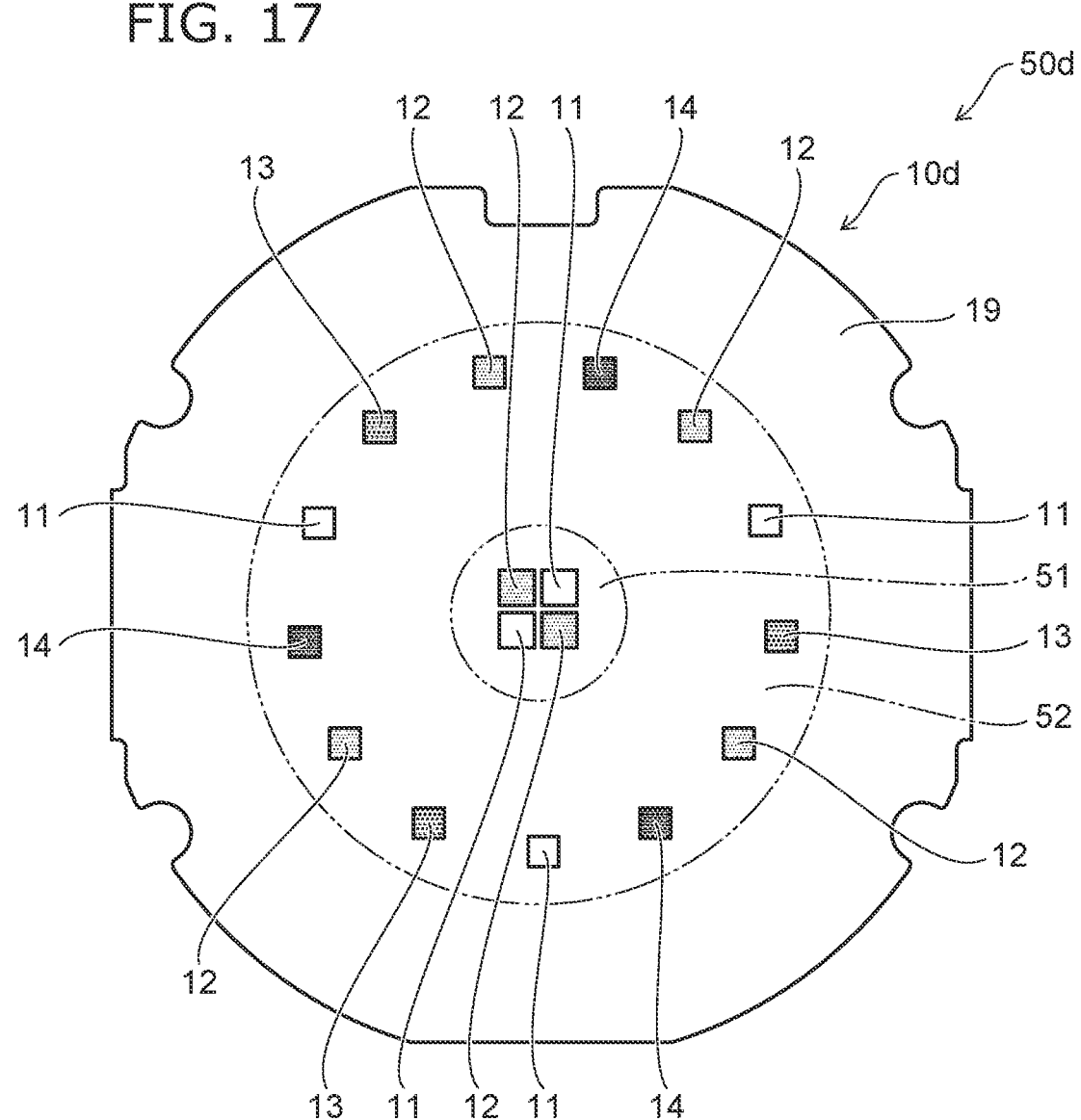
FIG. 17 is a plan view showing a light source portion of a fifth embodiment.

FIG. 17 is a plan view showing a light source portion of the present embodiment.

The light-emitting circuit according to the present embodiment is similar to the light-emitting circuit 82 shown in FIG. 15.

In the light source portion 10d of a light-emitting device 50d according to the present embodiment, both the first light-emitting element 11 and the second light-emitting element 12 are provided in the first region 51. The first light-emitting element 11, the second light-emitting element 12, the third light-emitting element 13, and the fourth light-emitting element 14 are provided in the second region 52. In FIG. 17, the number of the illustrated light-emitting elements is less than the actual number to simplify the drawing. This is similar for FIG. 18 and FIG. 19 described below as well.

According to the present embodiment, compared to the second embodiment, the light exited from the first light condenser 22 and the second light condenser 23 to illuminate a narrow-angle region are also illuminate with the state in which the first light-emitting element 11 emits light solitarily can be changed continuously to the state in which both the first light-emitting element 11 and the second light-emitting element 12 emit light. Otherwise, the configuration, the operations, and the effects of the present embodiment are similar to those of the fourth embodiment.

Sixth Embodiment

A sixth embodiment will now be described.

Figure 18:
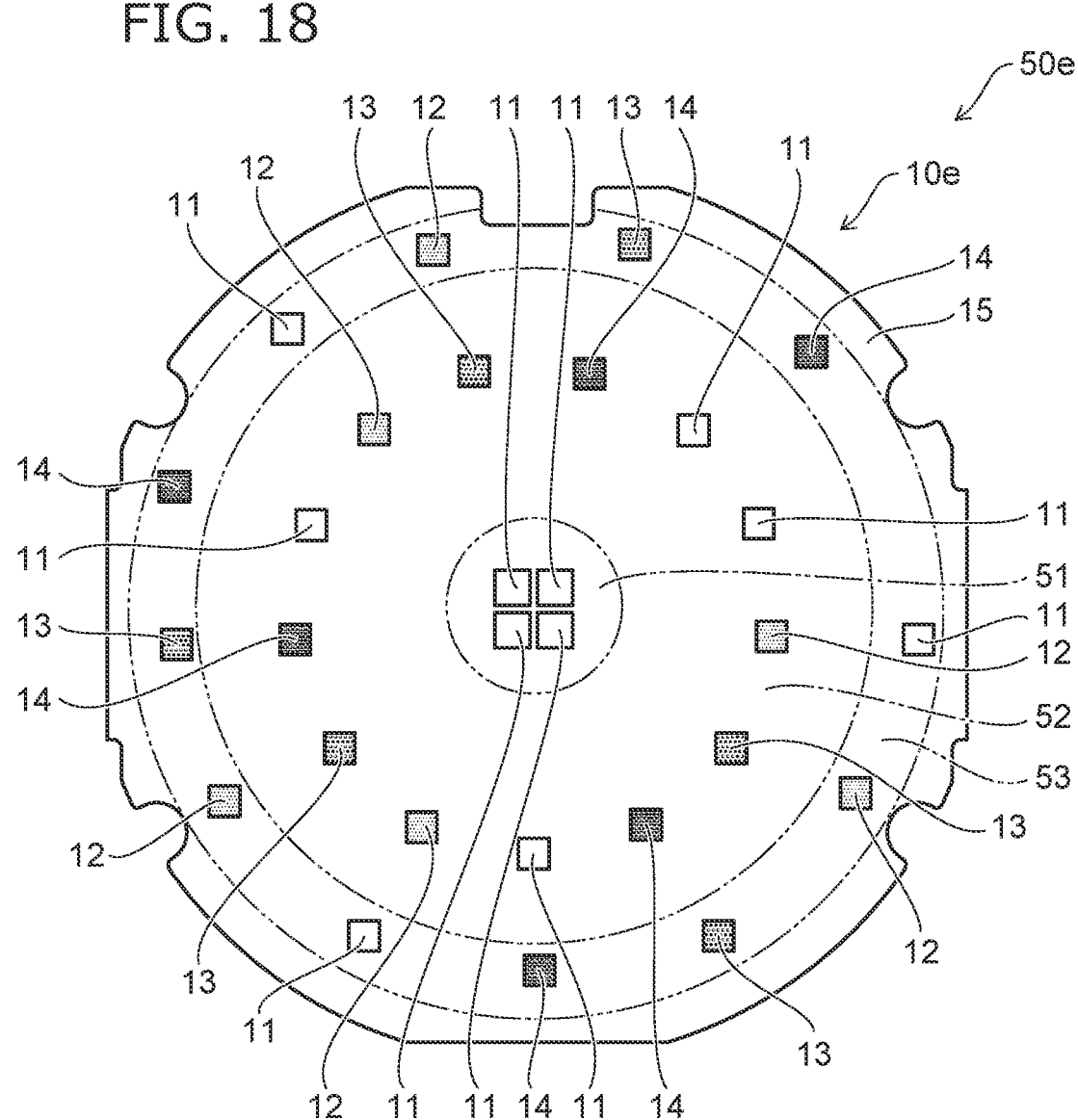
FIG. 18 is a plan view showing a light source portion of a sixth embodiment.

FIG. 18 is a plan view showing a light source portion of the present embodiment.

Figure 19:
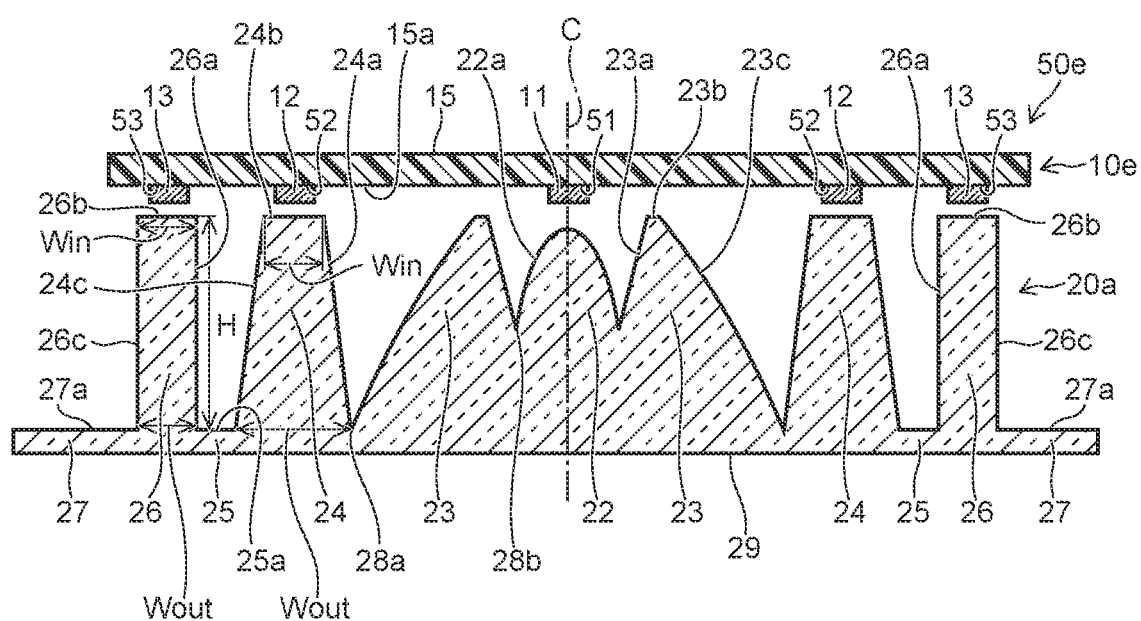
FIG. 19 is an end view showing an optical member of the sixth embodiment.

FIG. 19 is an end view showing an optical member of the present embodiment.

The light source portion 10e is provided in a light-emitting device 50e according to the present embodiment. In the light source portion 10e, one or more first light-emitting elements 11 is provided in the first region 51. One or more first light-emitting elements 11, one or more second light-emitting elements 12, one or more third light-emitting elements 13, and one or more fourth light-emitting elements 14 are provided in the second region 52. One or more first light-emitting elements 11, one or more second light-emitting elements 12, one or more third light-emitting elements 13, and one or more fourth light-emitting elements 14 are provided in a third region 53 as well. Accordingly, in the entire light source portion 10e, three or more first light-emitting elements 1, two or more second light-emitting element 12, two or more third light-emitting element 13, and two or more fourth light-emitting element 14 are provided. The first region 51 is a region having a circular configuration including the center of the wiring substrate 15, the second region is a region having a circular annular configuration disposed at the periphery of the first region 51, and the third region 53 is a region having a circular annular configuration disposed at the periphery of the second region 52.

In the present embodiment, similarly to the fourth embodiment, for example, the color temperature of the light emitted from the first light-emitting element 11 is 2700 K, the color temperature of the light emitted from the second light-emitting element 12 is 2000 K, the color temperature of the light emitted from the third light-emitting element 13 is 3500 K, and the color temperature of the light emitted from the fourth light-emitting element 14 is 6500 K. However, this is not requirement, and it is sufficient for the color temperatures to be different from each other.

In the light-emitting device 50e, similarly to the second embodiment, the optical member 20a further includes the flat plate portion 27 and the second light guide portion 26 guiding the light incident from the third region 53 at the periphery of the second region 52. The FWHM of the light emitted from the second light guide portion 26 is larger than the FWHM of the light emitted from the first light guide portion 24.

The second light guide portion 26 is provided at the outer side of the flat plate portion 25. The second light guide portion 26 is a transparent tubular member surrounding the periphery of the first light guide portion 24 in a ring configuration. The second light guide portion 26 is disposed at a position corresponding to the third region 53 of the light source portion 10e and is disposed at, for example, a position opposing the third region 53.

Effects of the present embodiment will now be described.

According to the present embodiment, similarly to the fourth embodiment, the color temperature can be controlled in a wide range because four types of light-emitting elements having mutually-different color temperatures are provided. The state in which the first light-emitting elements 11 emit light solitarily can transition smoothly and continuously to the state in which all of the light-emitting elements emit light. Thereby, the color temperature, the luminous flux, and the light distribution angle can be changed continuously. Also, it is possible to change the color of the light to follow blackbody radiation.

Light-emitting elements are disposed in the third region 53 of the light source portion 10e, and the optical member 20a includes the second light guide portion 26 guiding the light incident from the third region 53, thus the light distribution angle can be changed in a wider range.

The invention can be utilized in, for example, an indoor lighting device, etc.

The invention claimed is:

1. A light-emitting circuit, comprising:
   first light-emitting elements;
   second light-emitting elements; and
   resistance elements,
   wherein a color temperature of light emitted from the second light-emitting elements is different from a color temperature of light emitted from the first light-emitting elements,
   wherein an anode side terminal of a first circuit and an anode side terminal of a second circuit are connected to a first terminal of a direct-current power supply, the first circuit including the first light-emitting elements and the resistance elements, the first light-emitting elements and the resistance elements being connected in series in the first circuit, the second circuit including the second light-emitting elements,
   wherein a cathode side terminal of the first circuit and a cathode side terminal of the second circuit are connected to a second terminal of the direct-current power supply, and
   wherein resistance values of the resistance elements are adjusted so that a first current value is more than a second current value and the first current value is less than a third current value, the first current value being a value of a current input from the direct-current power supply at which a luminous flux of the first light-emitting elements is saturated, the second current value being a value of the current input from the direct-current power supply at which the second light emitting element starts to emit light, and the third current value being a value of the current input from the direct-current power supply at which a luminous flux of the second light-emitting elements is saturated.

2. The light-emitting circuit according to claim 1, wherein the resistance values of the resistance elements are adjusted so that an anode-cathode voltage of each of the first light-emitting elements and an anode-cathode voltage of each of the second light-emitting elements are equal in case that a value of the current input from the direct-current power supply is the third current value.

3. The light-emitting circuit according to claim 1, wherein a number of stages of the first light-emitting elements connected in series in the first circuit is less than a number of stages of the second light-emitting elements connected in series in the second circuit.

4. The light-emitting circuit according to claim 1,
   wherein the first light-emitting elements are disposed in a first region of a wiring substrate, and
   wherein the second light-emitting elements are disposed in a second region of the wiring substrate, the second region surrounding the first region.

5. A light-emitting circuit, comprising:
   first light-emitting elements;
   second light-emitting elements; and
   resistance elements,
   wherein a color temperature of light emitted from the second light-emitting elements is different from a color temperature of light emitted from the first light-emitting elements,
   wherein an anode side terminal of a first circuit and an anode side terminal of a second circuit are connected to a first terminal of a direct-current power supply, the first circuit including the first light-emitting elements and the resistance elements, the first light-emitting elements and the resistance elements being connected in series in the first circuit, the second circuit including the second light-emitting elements,
   wherein a cathode side terminal of the first circuit and a cathode side terminal of the second circuit are connected to a second terminal of the direct-current power supply,
   wherein a luminous flux of the first light-emitting elements increases as a current input from the direct-current power supply increases in case that the current is less than a first current value,
   wherein a luminous flux of the second light-emitting elements increases as the current increases in case that the current is more than a second current value, and
   wherein the second current value is less than the first current value.

6. The light-emitting circuit according to claim 5,
   wherein a color temperature of a light emitted from the first light-emitting elements and the second light-emitting elements is constant in case that the current is less than the second current value, and
   wherein the color temperature of the light emitted from the first light-emitting elements and the second light-emitting elements changes according to the current in case that the current is more than the second current value.

7. The light-emitting circuit according to claim 5, wherein an anode-cathode voltage of each of the first light-emitting elements and an anode-cathode voltage of each of the second light-emitting elements are equal in case that a value of the current input from the direct-current power supply is a third current value at which a luminous flux of the second light-emitting elements is saturated.

8. The light-emitting circuit according to claim 5, wherein a number of stages of the first light-emitting elements connected in series in the first circuit is less than a number of stages of the second light-emitting elements connected in series in the second circuit.

9. The light-emitting circuit according to claim 5,
wherein the first light-emitting elements are disposed in a first region of a wiring substrate, and
wherein the second light-emitting elements are disposed in a second region of the wiring substrate, the second region surrounding the first region.

10. A light-emitting circuit, comprising:
first light-emitting elements;
second light-emitting elements; and
resistance elements,
wherein a color temperature of light emitted from the second light-emitting elements is different from a color temperature of light emitted from the first light-emitting elements,
wherein an anode side terminal of a first circuit and an anode side terminal of a second circuit are connected to a first terminal of a direct-current power supply, the first circuit including the first light-emitting elements and the resistance elements, each of the first light-emitting elements and the resistance elements being connected in series in the first circuit, the second circuit including the second light-emitting elements,
wherein a cathode side terminal of the first circuit and a cathode side terminal of the second circuit are connected to a second terminal of the direct-current power supply,
wherein a color temperature of a light emitted from the first light-emitting elements and the second light-emitting elements is constant in case that a current input from the direct-current power supply is less than a current value, and
wherein the color temperature of the light emitted from the first light-emitting elements and the second light-emitting elements changes according to the current in case that the current is more than the current value.

11. The light-emitting circuit according to claim 10, wherein
an anode-cathode voltage of each of the first light-emitting elements and an anode-cathode voltage of each of the second light-emitting elements are equal in case that a value of the current input from the direct-current power supply is a current value at which a luminous flux of the second light-emitting elements is saturated.

12. The light-emitting circuit according to claim 10, wherein
a number of stages of the first light-emitting elements connected in series in the first circuit is less than a number of stages of the second light-emitting elements connected in series in the second circuit.

13. The light-emitting circuit according to claim 10,
wherein the first light-emitting elements are disposed in a first region of a wiring substrate, and
wherein the second light-emitting elements are disposed in a second region of the wiring substrate, the second region surrounding the first region.

* * * * *